United States Patent
Seyama et al.

(10) Patent No.: US 10,631,311 B2
(45) Date of Patent: Apr. 21, 2020

(54) TRANSMITTER, WIRELESS COMMUNICATION SYSTEM, AND METHOD FOR PROCESSING IN TRANSMITTER

(71) Applicant: FUJITSU LIMITED, Kawasaki-shi, Kanagawa (JP)

(72) Inventors: Takashi Seyama, Kawasaki (JP); Takashi Dateki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 15/906,753

(22) Filed: Feb. 27, 2018

(65) Prior Publication Data

US 2018/0288780 A1  Oct. 4, 2018

(30) Foreign Application Priority Data

Mar. 31, 2017 (JP) .................................. 2017-070397

(51) Int. Cl.
*H04W 72/12* (2009.01)
*H04B 7/06* (2006.01)
*H04W 72/04* (2009.01)
*H04B 7/0452* (2017.01)

(52) U.S. Cl.
CPC .......... *H04W 72/12* (2013.01); *H04B 7/0452* (2013.01); *H04B 7/0617* (2013.01); *H04W 72/04* (2013.01)

(58) Field of Classification Search
None
See application file for complete search history.

(56) References Cited

U.S. PATENT DOCUMENTS

| 2005/0059356 A1* | 3/2005 | Lee ........................ G01S 11/10 455/67.16 |
| 2005/0265275 A1* | 12/2005 | Howard ............... H04B 7/0417 370/328 |
| 2009/0191881 A1* | 7/2009 | Shibata ................. H04W 24/04 455/446 |

(Continued)

FOREIGN PATENT DOCUMENTS

| JP | 2008-035288 A | 2/2008 |
| JP | 2011-030139 A | 2/2011 |
| JP | 2015-033098 A | 2/2015 |

OTHER PUBLICATIONS

Gesbert, D., et al., "Shifting the MIMO Paradigm", IEEE Signal Processing Magazine, vol. 24, No. 5, pp. 36-46, Sep. 2007.

*Primary Examiner* — Michael J Moore, Jr.
*Assistant Examiner* — Gautam Sharma
(74) *Attorney, Agent, or Firm* — Arent Fox, LLP

(57) ABSTRACT

A transmitter includes: a plurality of transmission antennas; a channel estimator configured to estimate channels between the plurality of transmission antennas and a plurality of receivers; a scheduler configured to schedule a combination of target receivers of transmitting downlink signals on same radio resource among the plurality of receivers; and a transmitter configured to transmit downlink signals intended for the combination scheduled by the scheduler by beam forming from the plurality of transmission antennas on the same radio resource. The scheduler modifies a selecting rule related to the combination of target receivers in accordance with a delay time of an opportunity of transmitting the downlink signal from a timing of estimating the channels.

12 Claims, 16 Drawing Sheets

(56) References Cited

U.S. PATENT DOCUMENTS

| | | | |
|---|---|---|---|
| 2009/0296798 A1* | 12/2009 | Banna | H04B 1/70754 375/229 |
| 2010/0182198 A1* | 7/2010 | Wen | H01Q 3/2605 342/373 |
| 2010/0246720 A1* | 9/2010 | Wang | H04L 1/0015 375/316 |
| 2012/0140667 A1 | 6/2012 | Nakayama | |
| 2016/0183275 A1 | 6/2016 | Inoue et al. | |

* cited by examiner

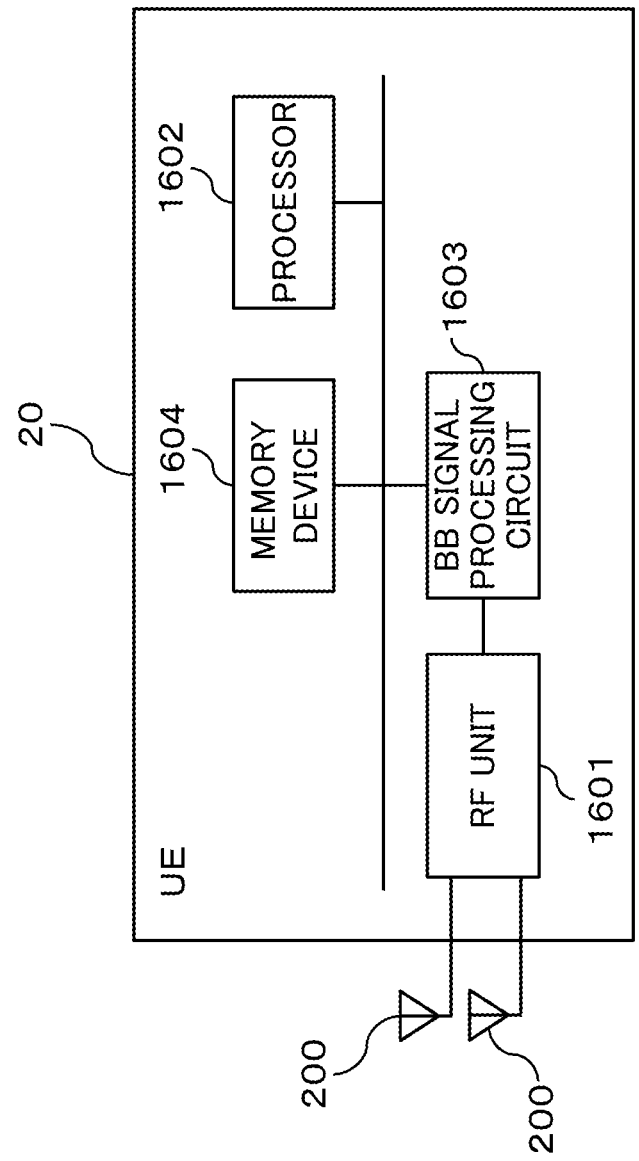

TRANSMITTER, WIRELESS COMMUNICATION SYSTEM, AND METHOD FOR PROCESSING IN TRANSMITTER

CROSS-REFERENCE TO RELATED APPLICATION

This application is based upon and claims the benefit of priority of the prior Japanese Patent Application No. 2017-070397, filed on Mar. 31, 2017, the entire contents of which are incorporated herein by reference.

FIELD

The embodiments described herein relate to a transmitter, a wireless communication system, and a method for processing in a transmitter.

BACKGROUND

A technique called multi-user (MU) multiple-input and multiple-output (MIMO) has been known in which a data signal is simultaneously transmitted to multiple users equipment (UEs) at the same frequency from a base station including multiple transmission antennas. Here, a base station is an example of a transmitter station when wireless communication is focused on downlink (DL), and a UE is an example of a receiver when the wireless communication is focused on the DL.

In MU-MIMO, a technique of inter-user signal orthogonalization has been known which is exemplified by zero forcing (ZF), which multiplies a transmission signal by a transmission weight in the base station not to occur interference between UEs, and block diagonalization (BD).

[Patent Document 1] Japanese Laid-open Patent Publication No. 2015-33098

[Patent Document 2] Japanese Laid-open Patent Publication No. 2008-35288

[Patent Document 3] Japanese Laid-open Patent Publication No. 2011-30139

[Non-Patent Document 1] D. Gesbert, M. Kountouris, R. Heath Jr., C. Chae, and T. Salzer, "Shifting the MIMO Paradigm," IEEE Signal Process. Mag., vol. 24, no. 5, pp. 36-46, September 2007.

In traditional techniques of inter-user signal orthogonalization, a receiver moving faster more easily deviates from a direction (referred to as "null") that minimizes the gain of the beam formed by application of a transmission weight in the transmitter.

Therefore, interference may occur between UEs moving different speeds. If signal interference occurs between UEs, the throughput performance of the DL degrades, for example.

SUMMARY

According to an aspect of the embodiments, a transmitter may include a plurality of transmission antennas; a channel estimator configured to estimate channels between the plurality of transmission antennas and a plurality of receivers; a scheduler configured to schedule a combination of target receivers of transmitting downlink signals on same radio resource among the plurality of receivers; and a transmitter configured to transmit downlink signals intended for the combination scheduled by the scheduler by beam forming from the plurality of transmission antennas on the same radio resource. The scheduler may modify a selecting rule related to the combination of target receivers in accordance with a delay time of an opportunity of transmitting the downlink signal from a timing of estimating the channels.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a block diagram schematically illustrating an example of a hardware configuration of a UE according to an embodiment.

DESCRIPTION OF EMBODIMENTS

Figure 1:
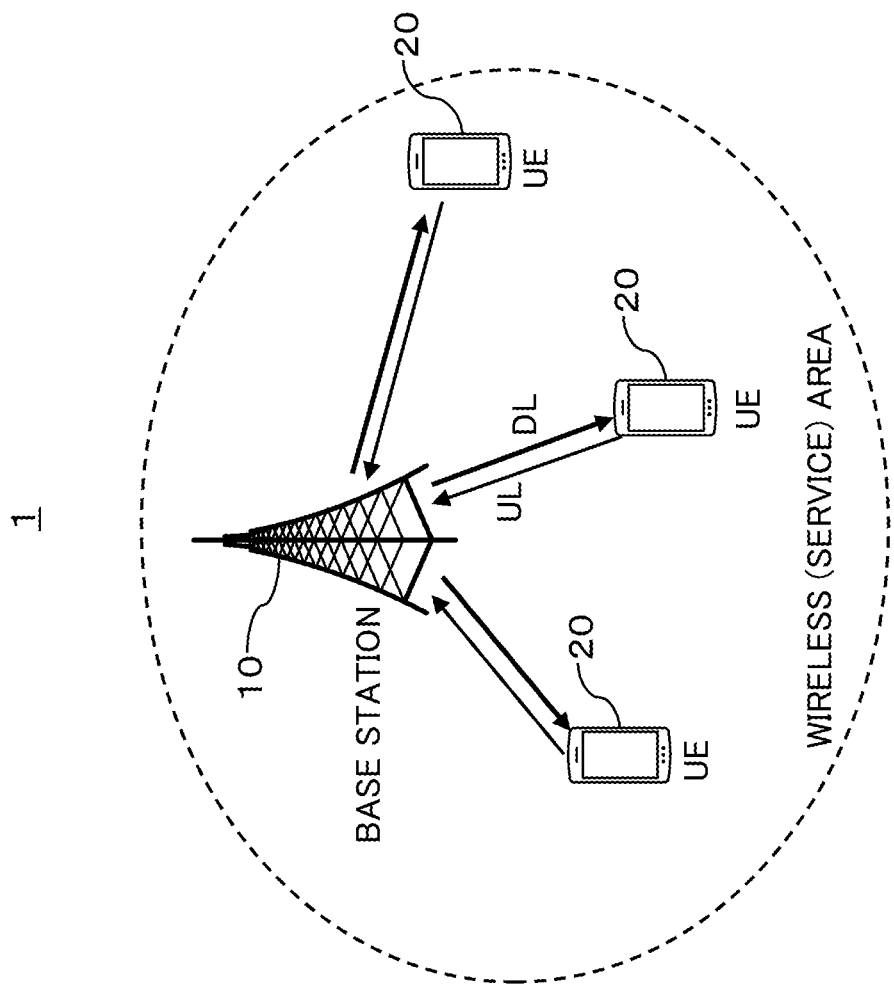
FIG. 1 is a block diagram schematically illustrating an example of the configuration of a wireless communication system according to an embodiment.

Hereinafter, description will now be made in relation to embodiments with reference to accompanying drawings. The following embodiments are exemplary and have no intention to exclude various modifications and applications of techniques not referred in the present embodiments. The following exemplary embodiments may be appropriately combined. Throughout the drawing for describing the embodiments, like reference numbers designate the same or substantially the same parts and elements unless otherwise specified.

FIG. 1 is a block diagram schematically illustrating an example of the configuration of a wireless communication system according to one embodiment. A wireless communication system 1 of FIG. 1 may exemplarily include a base station 10 and UEs 20.

The base station 10 forms or provides a wireless area in which the base station 10 is wirelessly communicable with a UE 20. A "wireless area" may also be referred to as, for example, a "cell", a "coverage area", a "communication area", and a "service area". Multiple UEs 20 may be accommodated in the wireless area.

The base station 10 may be an "eNB" that conforms to long term evolution (LTE) and LTE-Advanced (hereinafter collectively abbreviated to "LTE") of 3rd generation partnership project (3GPP).

The term "eNB" is an abbreviation for an "evolved Node B". As to be detailed below with reference to FIG. 15, the base station 10 can be regarded as a communication point which is isolated from the main unit of the base station and remotely arranged and which is referred to as a Remote Radio Head (RRH). The term "RRH" may sometimes referred to also as a Remote Radio Unit (RRU) or a Remote Radio Equipment (RRE).

A "cell" that the base station 10 forms or provides may be divided into "sector cells". The "cell" may include a macro cell or a small cell. A small cell may be called differently with a coverage area.

For example, a small cell may be referred to as a "femtocell", a "picocell", a "microcell", a "nanocell", a "metro cell", and a "home cell".

The base station 10 may control allocation of radio resource that is to be used for wireless communication with a UE 20. Controlling allocation of radio resource may be referred to as "scheduling". Radio resource (hereinafter, sometimes simply referred to as "resource") may exemplarily be divided in two dimensions of frequency and time.

The base station 10 may allocate radio resource that can be used for communication with a UE 20 in a unit of frequency-time grid divided in two dimensions of frequency and time. An exemplary unit of allocation of resource may be a resource block (RB) when the wireless communication system 1 confirms to LTE.

A RB corresponds to a block obtained by dividing radio resource that the base station 10 can use for wireless communication with a UE 20 in units of a slot in a time domain and multiple subcarriers contiguous in a frequency domain.

For example, one slot of LTE has a time length of 0.5 ms, two slots constitute one subframe having a 1-ms length, and ten subframes constitute a wireless frame having a 10-ms length.

For example, a RB is represented by two slots (equals to one subframe)×12 subcarriers. LTE calls one slot×12 subcarriers a "physical resource block (PRB)" and calls two PRBs in one subframe "PRB pair".

A UE 20 is an example of a device that can wirelessly communicate with a base station 10 in a wireless area that the same base station 10 forms or provides. The "UE" may be also referred to as, for example, a "wireless terminal", a "wireless device", a "wireless apparatus", and a "terminal apparatus". A portable "UE" may be referred to as a "mobile terminal" and a "mobile station". Non-limited examples of a mobile station include a mobile telephone, a smartphone, and a tablet terminal.

To the communication between the base station 10 and a UE 20, techniques of Orthogonal Frequency Division Multiplexing (OFDM), Filtered Orthogonal Frequency Division Multiplexing (F-OFDM), universal filtered OFDM (UF-OFDM), and Filter Bank Multi-Carrier (FBMC) may be exemplarily applied.

OFDM and F-OFDM each attach a Cyclic Prefix (CP) to an effective symbol in order to suppress interference between symbols. In contrast to the above, UF-OFDM puts a non-transmitting section called a guard interval (GI) between effective symbols in place of a CP. These schemes intend to suppress interference between symbols.

In the technique of MU-MIMO, a transmission weight of beam forming (BF) is determined in accordance with a DownLink (DL) channel between a base station 10, which is an example of a DL transmitter, and a UE 20, which is an example of a receiver DL station.

A DL channel is estimated by the UE 20 using a reference signal (RS) transmitted from the base station 10. The information of the estimated DL channel may be fed back from the UE 20 to the base station 10. A reference signal may be referred to as a pilot signal.

Otherwise, a Time Division Duplex (TDD) system may use an UpLink (UL) channel that the base station 10 estimates using a Sounding Reference Signal (SRS) transmitted from a UE 20 as a result of estimating a DL channel because a TDD system can use "channel reciprocity" that regards the DL channel as one that coincides with the UL channel.

As described above, in estimation of the DL channel, transmission of an RS from the base station 10, transmission of an SRS from a UE 20, and feedback transmission of DL channel information from the UE 20 to the base station 10 are carried out.

In order to reduce the overhead of using radio resource in the above transmissions, it is adequate that the estimation of a DL channel is intermittently or periodically performed at some time intervals, not each time point such as at each subframe.

Figure 2:
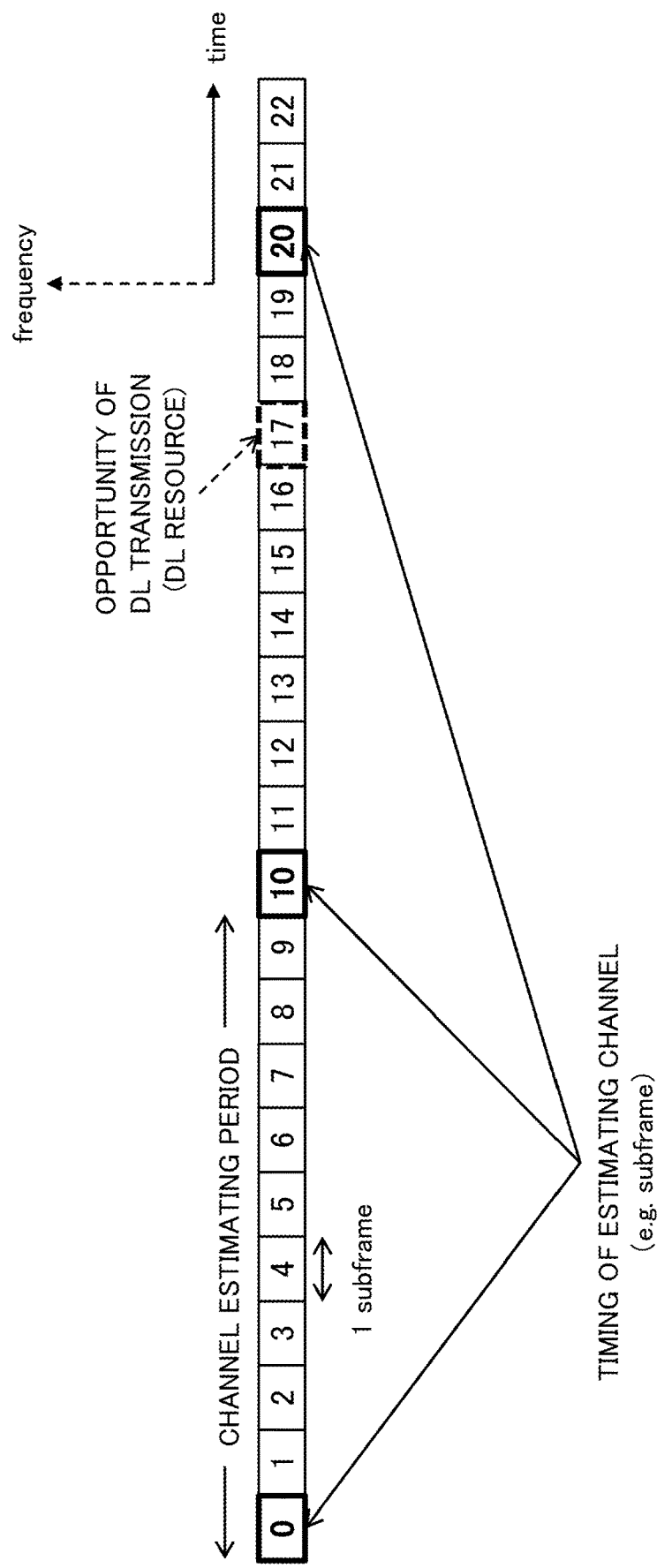
FIG. 2 is a diagram illustrating an example of a channel estimating period.

FIG. 2 illustrates an example. In the example of FIG. 2, channel estimation is carried out at intervals of ten subframes, such as at subframe #0, subframe #10, subframe 20 . . . . For example, focusing on the DL transmission at subframe #17, the latest channel estimated value at the opportunity of transmitting (timing of transmission) at that time is the channel estimated value estimated at subframe #10.

Here, in cases where the UE 20 is moving or electromagnetic scatter around the UE 20 is moving, the channel fluctuates every moment due to fading. Such channel fluctuation sometimes causes a channel estimated value at a first timing at which transmission weights are calculated to have a difference from a channel estimated value at a second timing at which the UE 20 actually receives a data signal.

If channel estimated values at first and second timings have a difference, the orthogonality between users may be collapsed to generate interference between users. If interference between users is generated, the throughput performance of the DL may be degraded. Here, the term "throughput" may be referred to as a "channel capacity" or a "communication rate".

Description will now be made in relation to a mechanism of generating such interference between users with reference to FIGS. 3 and 4. For simplifying the description, the examples of FIGS. 3 and 4 assume a case where transmitting data signals respectively intended for two UE #1 and UE #2 are multiplexed and then transmitted by the base station 10.

Figure 3:
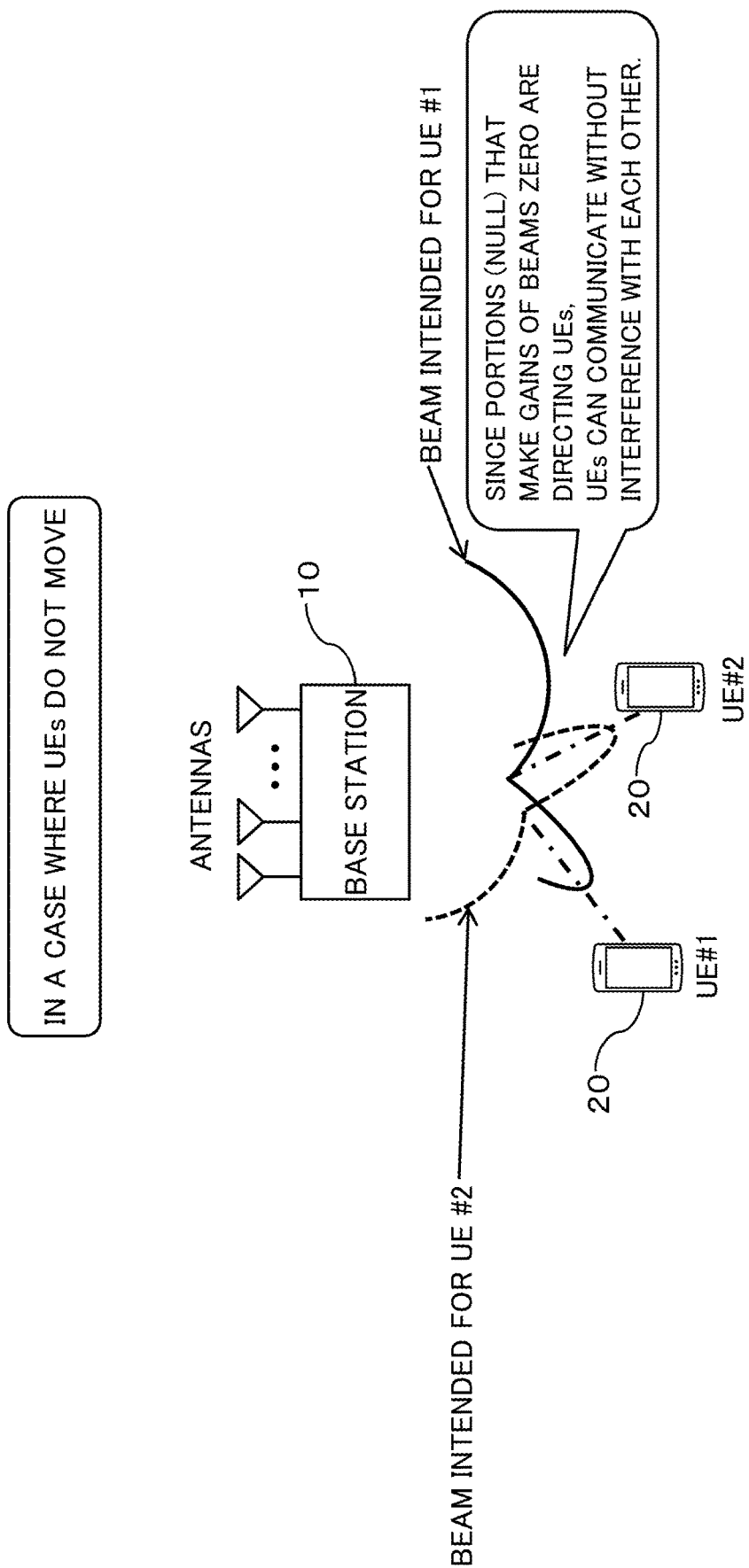
FIG. 3 is a diagram schematically illustrating an example of beam forming by a base station.
Figure 4:
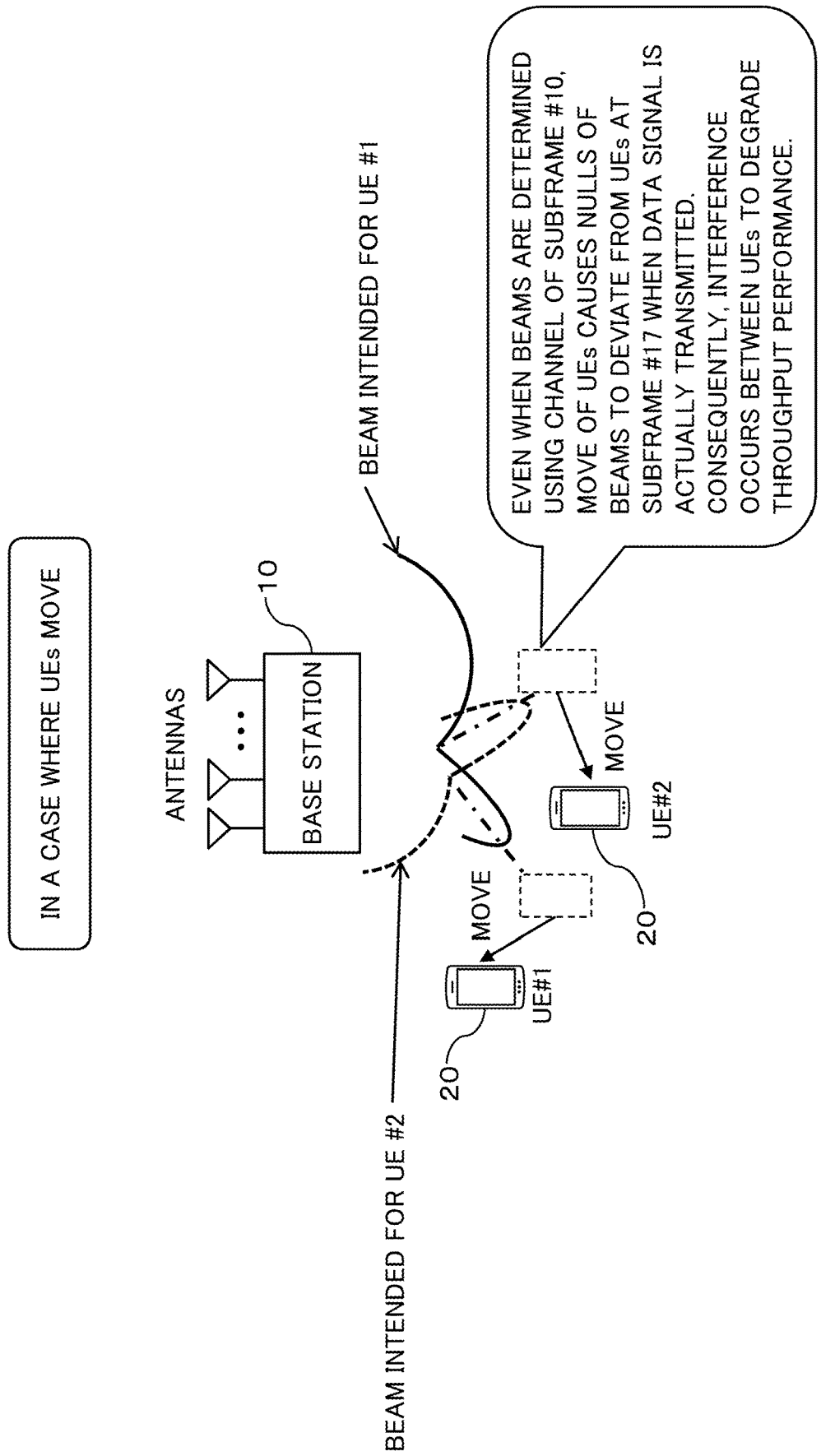
FIG. 4 is a diagram schematically illustrating an example that occurs inter-user interference in the example of FIG. 3.

The solid and broken curved lines in FIGS. 3 and 4 represent beams formed by transmission weights applied to data signals (may also be referred to as "streams") intended one for each of the UE #1 and the UE #2.

The "peak" of each curve corresponds to a direction that maximizes the gain of the beam and the "valley" corresponds to a direction (referred to as a "null") that minimizes (e.g., makes "zero") the gain of the beam. To orient the beam in such a direction that the gain of the beam is maximized is sometimes referred to as "beam steering" while to orient the beam in such a direction that the gain of the beam is minimized is sometimes referred to as "null steering".

As schematically illustrated in the example FIG. 3, the null of the beam directed from the base station 10 to the UE #1 is oriented to the UE #2, and the null of the beam directed from the base station 10 to the UE #2 is oriented to the UE #1. Accordingly, if the UE #1 and UE #2 both do not move, the UE #1 and the UE #2 are not deviated from the nulls respectively orientated to the UE#1 and the UE #2.

For the above, the DL communication between the UE #1 and the UE #2 generates no interference, and otherwise, generates minimum interference if any. Consequently, the throughput performance of the DL to the UE #1 and the UE#2 does not degrade, and otherwise the degrading in the throughput performance is suppressed to be the minimum, if any.

In contrast to the above, as schematically illustrated in the example FIG. 4, a case where one or the both of the UE #1 and the UE #2 move, in other words, a case where the base station 10 determines the transmission weights based on the channels estimated at the timing of the subframe #10 is assumed.

In this assumption, at the subframe #17, when the base station 10 actually transmits data signals, one or the both of the UE #1 and the UE #2 may be deviated from the nulls of the beams. Such deviation has a possibility of generating interference in the DL communication between the UE #1 and the UE #2 and consequently degrading the throughput performance of the DL.

As a solution to the above, description will now be made in relation to a technique to inhibit such inter-user interference from being generated.

In a mobile communication, a small cell that is smaller in size than a macro cell as described above may sometimes be provided as an example a cell in which the base station 10 provides service.

In a small cell, UEs 20 moves at a lower speed exemplified from resting to a walking speed at a higher ratio than that in a macro cell, which can be said that a small cell tends to accommodate less UEs 20 moving faster than the UEs that moves at a lower speed.

Figure 5:
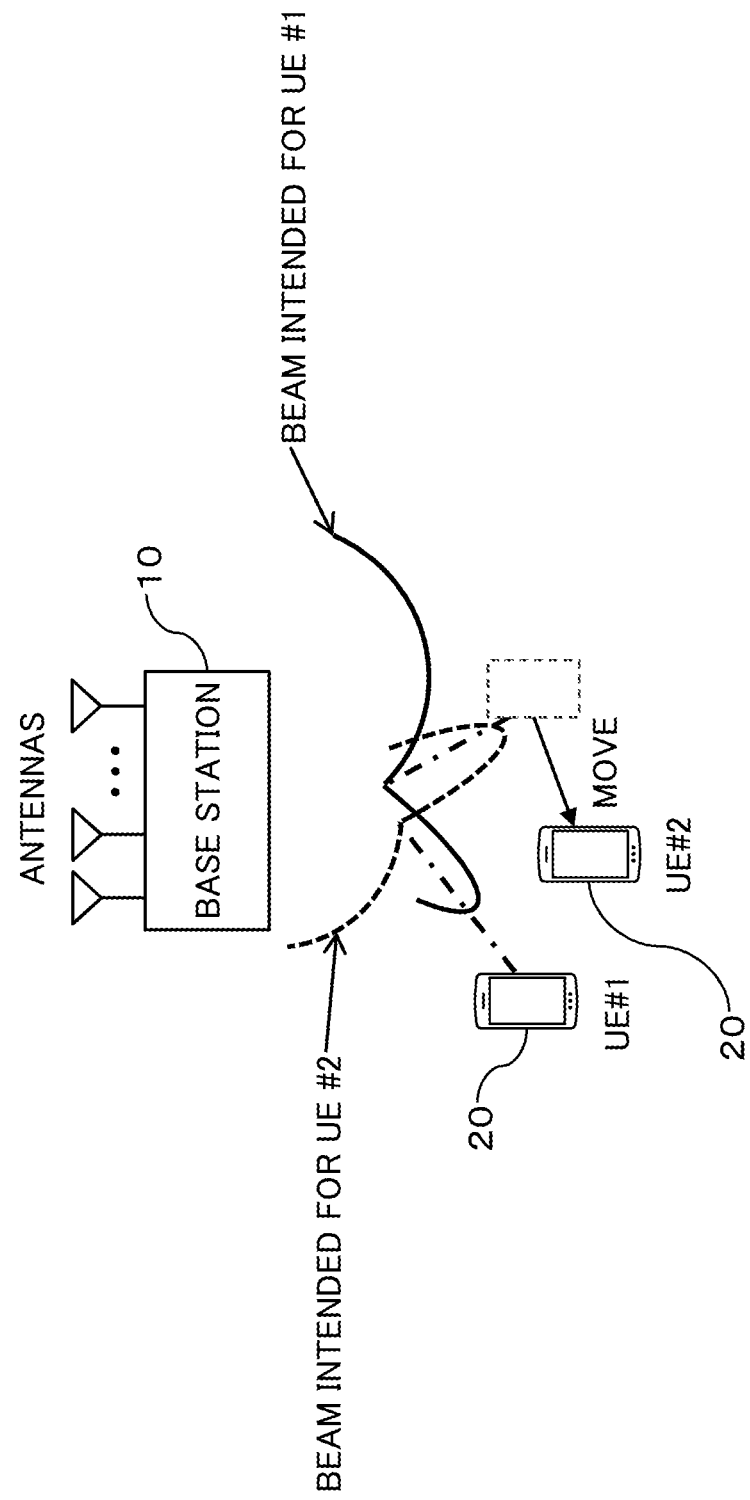
FIG. 5 is a diagram schematically illustrating beam forming by a base station.

FIG. 5 schematically illustrates a case where multiple UEs 20 moves at respective different speeds. The example FIG. 5 assumes that the UE #1 among two UEs of the UE #1 and the UE #2 is resting or moving slower than the UE #2, and the UE #2 moves faster than the UE #1.

In the case illustrated in example FIG. 5, since the UE #1, which is moving slowly, does not easily deviate from the null of the beam oriented to the UE #2, it can be said that the throughput performance of the DL does not easily degrade. In contrast, since UE #2, which is moving fast, easily deviates from the null of the beam oriented to the UE #1, it can be said that the throughput performance of the DL easily degrades.

Accordingly, in an MU-MIMO adopting a traditional inter-user orthgonalization technique, a UE moving fast tends to more easily degrade the throughput performance of the DL than a UE moving slowly.

Considering the above, the present embodiment carries out a control such that opportunity of DL transmission (in other words, DL resource) for a transmitting data signal intended for a UE moving fast is preferentially allocated to a timing as stochastically close to a channel estimating timing (a timing of estimating the channels) as possible.

Hereinafter, description will be described in relation to a couple of embodiments. In the following embodiments, a symbol $A^T$ represents a transposed matrix of a matrix A; a symbol $a^T$ represents a transposed vector of a vector a; the symbol $A^H$ represents a complex conjugate transposed matrix of a matrix A; the symbol $a^H$ represents a complex conjugate transposed vector of a vector a; a symbol $E\{A\}$ represents the average of A; the symbol $I_N$ represents an N×N an identity matrix; the symbol $O_{N \times M}$ represents an N×M matrix all the elements of which are zero; and a symbol diag $(a_1, a_2, \ldots, a_N)$ represents an diagonal matrix having elements $a_1, a_2, \ldots, a_N$ in the diagonal elements.

First Example

Figure 6:
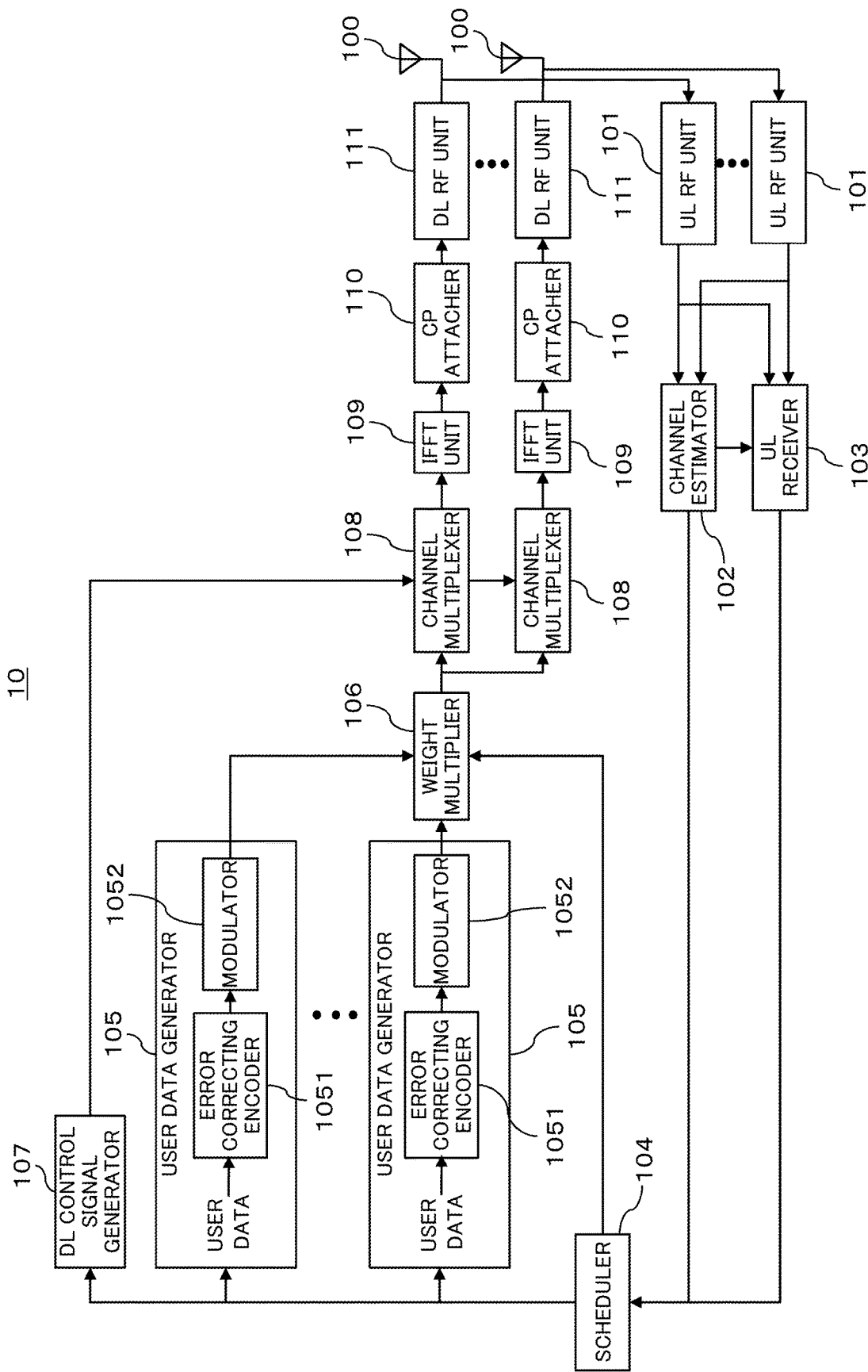
FIG. 6 is a block diagram schematically illustrating an example of the configuration of a base station according to an embodiment.

FIG. 6 illustrates an example of the configuration of the base station 10. Specifically, FIG. 6 can be regarded as an example of the configuration of the base station 10 under a circumstance where OFDM is applied to the wireless communication between the base station 10 and UEs 20.

The base station 10 may include multiple antennas 100. Additionally, the base station 10 may include, as examples of elements constituting an UL receiving system, multiple UL RF units 101, a channel estimator 102, and an UL receiver 103.

Furthermore, as examples of elements constituting a DL transmission system, the base station 10 may include multiple user data generators 105, a weight multiplier 106, a DL control signal generator 107, a channel multiplexer 108, an IFFT unit 109, a CP attacher 110, and a DL RF unit 111. The term "IFFT" here is an abbreviation for Inverse Fast Fourier Transform.

The base station 10 may further include a scheduler 104 as an example an element constituting a controlling system (also can be referred to as a "controller").

The antennas 100 may be shared by the DL transmission and the UL reception. Alternatively, the base station 10 may include antennas 100 for DL transmission and antennas 100 for the UL reception independently from each other. Focusing on the DL transmission, antennas 100 functions as the transmission antennas, and focusing on the UL reception, antennas 100 function as the reception antennas. The number of antennas 100 can be regarded as the number of transmitting streams of the DL. The technique of the MU-MIMO sometimes refers a "stream" as a "layer".

The UL RF units 101 may be provided as many as the number of streams. Each UL RF unit 101 carries out down-conversion to a radio frequency and analog-to-digital (AD conversion) on an UL signal received from a UE 20.

The channel estimator 102 estimates an UL channel on the basis of an UL signal which is transmitted from a UE 20 and is received by the UL RF unit 101. The estimating of an UL cannel may be performed, for example, by using an SRS and a DM-RS that are transmitted from the UE 20. Here, an SRS may be used for measuring the quality of an UL channel. A DM-RS is an abbreviation for Demodulation Reference Signal and may be used for demodulating an UL data signal.

The UL receiver 103 exemplarily carries out a receiving process on an UL signal which is transmitted from a UE 20 and is received by the UL RF unit 101. An UL signal received by the UL receiver 103 may exemplarily include an UL data signal that the UE 20 transmits, ACK/NACK information related to a DL data signal that the base station 10 transmits, and Channel State Information (CSI) that the UE 20 transmits (feeds back). The ACK/NACK information is an example of receiving acknowledgment information related to a data signal, specifically "ACK" represents success in receiving or decoding while "NACK" represents failure in receiving or decoding.

When "channel reciprocity" is established between the DL and the UL like TDD, the estimated value of the UL channel estimated by the channel estimator 102 may be input, as an estimated value of the DL channel, into the scheduler 104. If the Frequency Division Duplex (FDD) is adopted, the CSI received by the UL receiver 103 may be input, as an estimated value of the DL cannel, into the scheduler 104.

The scheduler 104 exemplarily schedules radio resources to be used for DL and UL communication with a UE 20. Example of the radio resource may be resource discriminated (divided) by frequency and time.

The scheduling of the DL may exemplarily include a process of selecting and determining a combination (may also be referred to as "set") of target users (UEs 20), to which DL data signals are to be transmitted to a certain time point (in other words, targets to be allocated DL resource). Furthermore, the scheduling may include a process of determining a transmission weight and a Modulation and Coding Scheme (MCS) for each UE 20 included in the determined combination.

The process of selecting and determining the combination of target UEs 20 may include calculating a criterion or metric (hereinafter "selecting metric") related to the selecting and determining of the target UEs 20. The selecting metric may also be referred to as Scheduling Metric (SM), which may be exemplarily calculated using a DL channel estimated value. The selecting metric is one of an example of a selecting rule related to the combination of target receivers.

For example, the scheduler 104 may calculate a SM in accordance with a scheduling algorithm such as a Proportional Fair (PF) criterion. It can be considered that a larger SM represents higher probability of allocation of a radio resource.

A SM may be controlled (may be referred to as "calibrated" or "modified") by a factor, a variable, and/or a coefficient applied to the SM according to the preference of communication, for example.

The user data generator 105 exemplarily generates user data intended for a UE 20 instructed by the scheduler 104. For this purpose, the user data generator 105 may exemplarily include an error correcting encoder 1051 and a modulator 1052.

The user data generators 105 may be provided as many as the number of streams of transmitting data signals. The user data is an example of a data signal that the base station 10 DL-transmits to UEs 20.

The error correcting encoder 1051 exemplarily carries out error correcting and encodes user data at the encoding ratio for the UE 20 instructed by the scheduler 104.

The modulator 1052 exemplarily modulates the user data after undergoing the error correcting and the encoding in a modulating scheme instructed by then scheduler 104.

The weight multiplier 106 exemplarily forms a beam by applying the transmission weight determined in the scheduler 104 to the data signal input from the user data generator 105.

The DL control signal generator 107 exemplarily generates a DL control signal, which may exemplarily include information whether data is allocated and information such as the MCS for each UE 20.

The channel multiplexer 108 exemplarily multiplexes a data signal applied thereto the transmission weight by the weight multiplier 106 and a DL control signal generated by the DL control signal generator 107 onto the DL channel.

The IFFT unit 109 exemplarily carries out an Invert Fast Fourier Transform (IFFT) on the signal (DL signal) of a DL channel multiplexed by the channel multiplexer 108, so that the signal is converted from a frequency domain to a time domain and converted to an effective symbol.

The CP attacher 110 exemplarily generates an OFDM symbol by attaching a CP to the effective signal obtained by the IFFT unit 109.

The DL RF unit 111 carries out a process of wireless DL transmission. The process of wireless DL transmission may exemplarily include up-conversion of the OFDM symbol generated by the CP attacher 110 to a radio frequency and digital-to-analog (DA) conversion of the OFDM symbol. The DL wireless signal obtained through the process of wireless DL transmission is transmitted to the UE 20 from the antenna 100.

The above elements 105-111 can be regarded as an example of a transmitter that transmits a DL signal intended for the combination of UEs scheduled by the scheduler 104 via the same radio resource by BF using the multiple antennas 100.

Next, description will now be made in relation to the details of the scheduler 104. In the following description, the number of transmission antennas of the base station 10 is represented by $N_{tx}$ and the number of reception antennas of the base station 10 is represented by $N_{rx}$. The number $N_{tx}$ is an integer of two or more and the number $N_{rx}$ is an integer of one or more.

Figure 7:
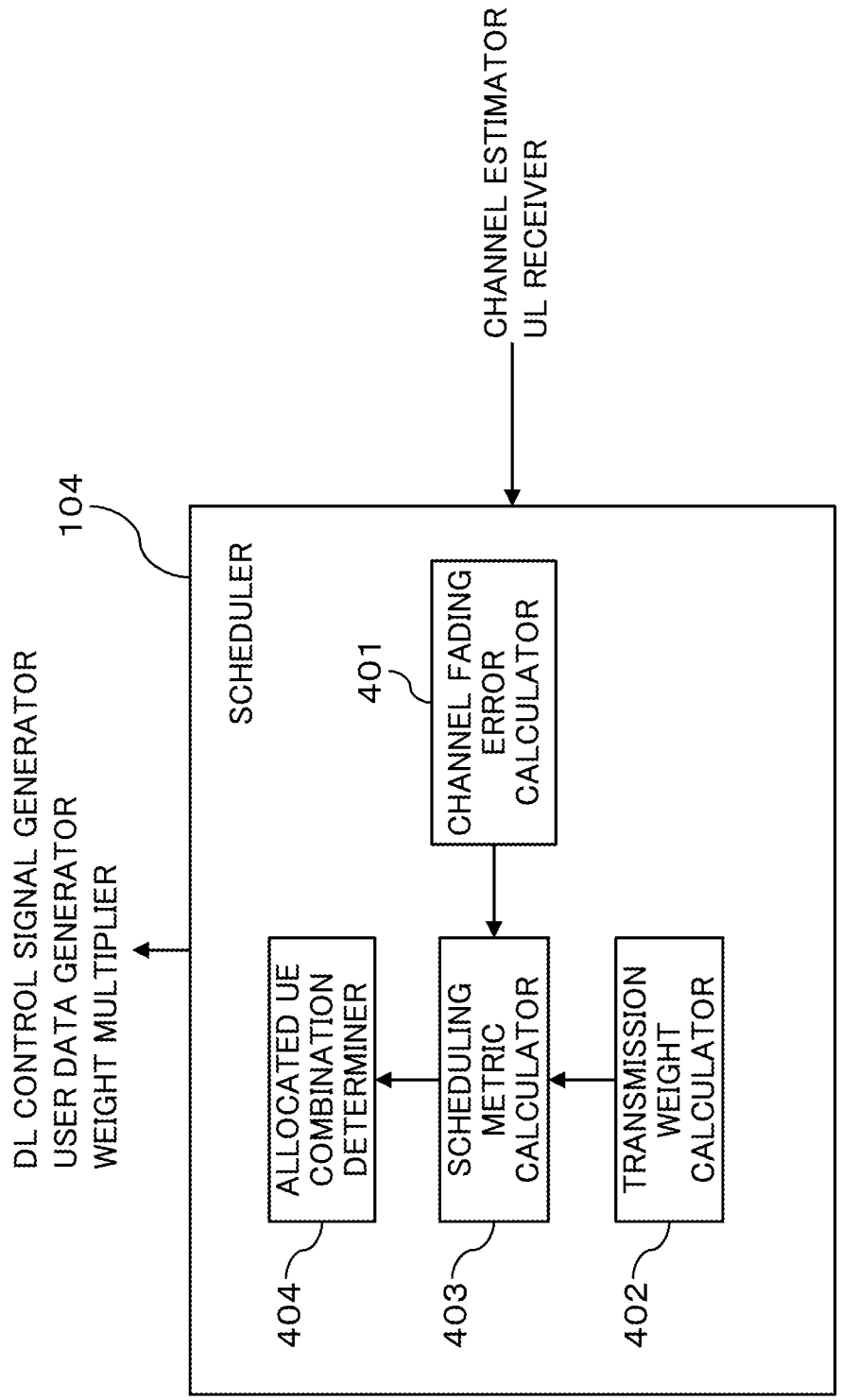
FIG. 7 is a block diagram schematically illustrating an example of the configuration of a scheduler of FIG. 6.

FIG. 7 illustrates an example of the configuration of the scheduler 104. As illustrated in FIG. 7, the scheduler 104 may exemplarily include a channel fading error calculator 401, a transmission weight calculator 402, a Scheduling Metric (SM) calculator 403, and an allocated UE combination determiner 404.

The channel fading error calculator 401 exemplarily calculates a fading error (hereinafter sometimes referred to as a "channel fading error") of channel estimated values estimated by the channel estimator 102 at multiple different timings.

A channel fading error fluctuates with a moving speed of a UE 20, which is an example of a receiver. For example, a higher moving speed of a UE 20 tends to increase a channel fading error. Accordingly, a channel fading error can be regarded as an example of information indicating a moving speed of a UE 20. Another example of information indicating a moving speed of a UE 20 includes a Doppler frequency that is to be described in a following second embodiment.

The transmission weight calculator 402 exemplarily calculates a transmission weight for each UE 20, using a channel estimated value obtained by the channel estimator 102.

The SM calculator 403 exemplarily calculates a SM, using an index of receiving quality at each UE 20 forecasted (or expected) in a case where the transmission weight calculated by the transmission weight calculator 402 is applied to a transmitting data signal intended for the UE 20. In calculating a SM, a channel fading error obtained by the channel fading error calculator 401 may be used for calibrating the SM.

The allocated UE combination determiner 404 exemplarily determines a combination of UEs 20 that maximizes the SM calculated by the SM calculator 403 to be the combination of target UEs to which data signals are to be transmitted.

Hereinafter, description will now be made in relation to an example of operation of the base station 10 with reference to FIG. 8.

Figure 8:
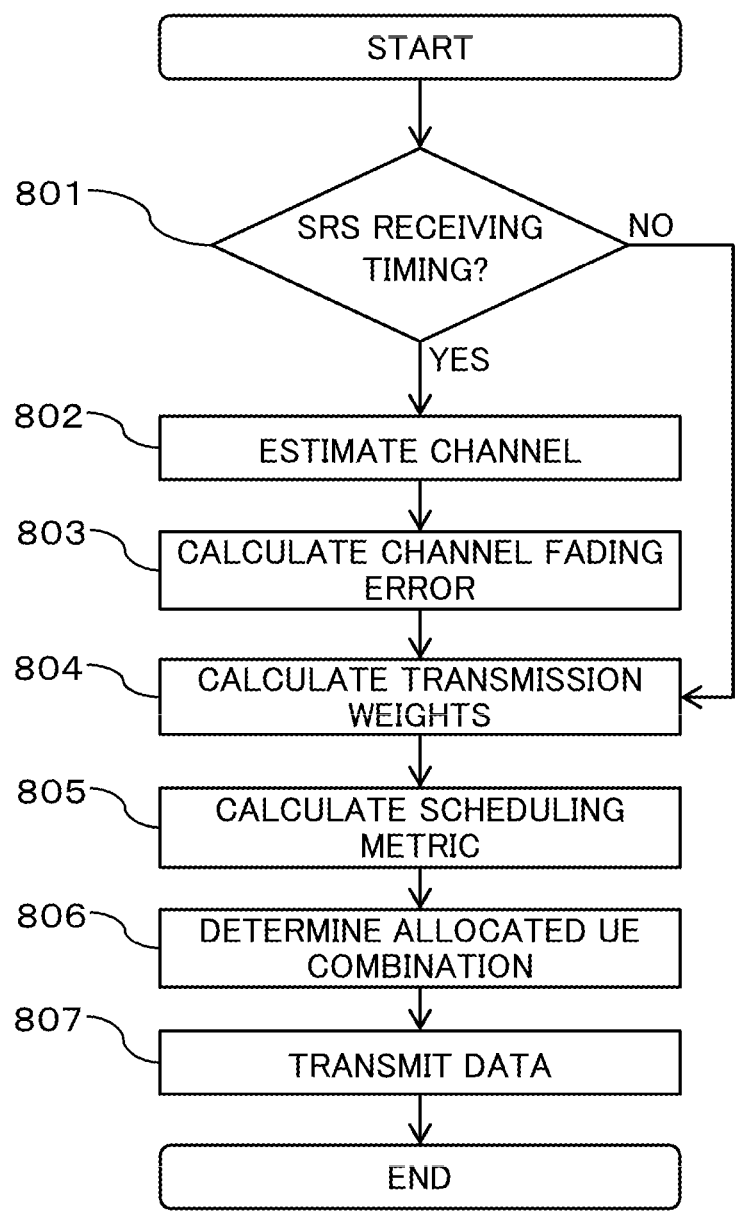
FIG. 8 is a flow diagram illustrating an example of the operation of a base station according to a first embodiment.

As illustrated in an example of FIG. 8, the base station 10 causes the scheduler 104 to check whether, for example, the present time point is at the timing of receiving an SRS transmitted from a UE 20 (Step 801).

If the present time point is at the timing of receiving an SRS (YES in Step 801), the scheduler 104 may instruct the channel estimator 102 to carry out the channel estimating. In response to the instruction, the channel estimator 102 may carry out channel estimating on the basis of the received SRS (Step 802).

In response to the execution of the channel estimating, the scheduler 104 may cause the channel fading error calculator 401 to calculate a channel fading error on the basis of the channel estimated value obtained by the channel estimator 102 (Step 803).

Also in response to the execution of the channel estimating, the scheduler 104 may cause the transmission weight calculator 402 to calculate the transmission weight for each UE 20 on the basis of the channel estimated value obtained by the channel estimator 102 (Step 804).

After the transmission weights are calculated, the scheduler 104 may cause the SM calculator 403 to calculate the SM. Additionally, the SM calculator 403 may calibrate the SM in accordance with the channel fading error obtained by the channel fading error calculator 401 (Step 805).

It can be considered that a channel fading error varies depending on a delay time of a timing of an opportunity of transmitting a DL signal from the channel estimating timing. The delay time may be a difference between a timing of an opportunity of transmitting a DL signal and the channel estimating timing. Accordingly, calibrating an SM in accordance with the channel fading error may be regarded as calibrating an SM in accordance with a delay time of a timing of an opportunity of transmitting a DL signal from the channel estimating timing.

Then, the scheduler 104 may cause the allocated UE combination determiner 404 to determine, for example, a combination of UEs 20 that maximizes the SM to be the combination of target UEs to which a data signal is to be transmitted (Step 806).

The scheduler 104 may provide the user data generators 105 with an instruction to transmit a data signal to the determined combination of UEs and may provide the weight multiplier 106 with the transmission weights to be applied to the determined combination of the UEs. Thereby, a data signal is to be transmitted to the determined combination of UEs (Step 807).

If the present time point is not at the timing of receiving an SRS (NO in Step 801), the scheduler 104 may skip Step 802 (estimating a channel) and Step 803 (calculating a channel fading error) and carry out process of and subsequent to Step 804 (calculating transmission weights).

Next, description will now be made in relation to an example of scheduling (Steps 803 to 806) made by the scheduler 104 at an opportunity of DL transmission (time point t).

A delay time from the immediate previous (latest) channel estimating timing at a time point t is represented by τ. In other words, the time point when the latest channel estimated value is obtained is the time point t−τ. The time period for estimating a channel is represented by $T_{chest}$.

The channel fading error calculator 401 may calculate a channel fading error $\varepsilon_k$ between the latest two channel estimated values for each UE 20 which is exemplified by a channel fading error between the channel estimated value at the time point t−τ and the channel estimated value at the time point t−τ−$T_{chest}$ using Expression 1.

[Expression 1]

$$\varepsilon_k = \frac{1}{N_{rx}N_{tx}} \sum_{j=1}^{N_{rx}} \sum_{i=1}^{N_{tx}} \frac{|h_{k,j,i}(t-\tau-T_{chest}) - h_{k,j,k}(t-\tau)|^2}{|h_{k,j,i}(t-\tau-T_{chest})||h_{k,j,i}(t-\tau)|} \quad (1)$$

where, the term $h_{k,j,i}(t)$ represents a channel estimated value between the transmission antenna #i of the base station 10 between the reception antenna #j of the UE #k at the time point t. The symbols i, j, and k are natural numbers.

Expression 1 represents that since a higher moving speed of a UE 20 more increases numerator (i.e., the square of the difference) than the denominator, the channel fading error $\varepsilon_k$ increases; and in contrast, since a lower moving speed of a UE 20 makes the numerator more closer to zero, the channel fading error $\varepsilon_k$ approaches zero. The channel fading error $\varepsilon_k$ expressed by Expression 1 is normalized by the amplitude and therefore does not depend on the geographical distance of each UE 20 to the base station 10.

The transmission weight calculator 402 calculates a transmission weight in the following manner.

A candidate for a UE combination containing K (an integer of two or more) UEs #1-#K is represented by a symbol u. An $N_{rx} \times N_{tx}$ channel matrix having a channel $h_{k,j,i}(t)$ of the k-th UE #k in the UE combination candidate u at an element at the j-th row and the i-th column is represented by $H_k(t)$.

First of all, the transmission weight calculator 402 generates a $(K-1)N_{rx} \times N_{tx}$ combined channel matrix $L_k$ obtained by combining the latest channel estimating values of the UE#1 to UE#k−1 and UE#k+1 to UE#K except of the k-th UE #k using Expression 2.

[Expression 2]

$$L_k = [H_1^T(t-\tau) \ldots H_{k-1}^T(t-\tau)H_{k+1}^T(t-\tau) \ldots H_K^T(t-\tau)]^T \quad (2)$$

The present embodiment uses the latest channel matrix. Alternatively, a channel matrix estimated from multiple past channel matrices may be used in place of the latest channel matrix.

Next, the transmission weight calculator 402 performs singular value decomposition on the combined channel matrix $L_k$ using Expression 3.

[Expression 3]

$$L_k = U_k[S_k^{(1)} O_{(K-1)N_{rx} \times \{N_{tx}-(K-1)N_{rx}\}}][V_k^{(1)} V_k^{(0)}]^H \quad (3)$$

where, $U_k$ represents a $(K-1)N_{rx} \times (K-1)N_r$ matrix in which the left-singular vectors of $L_k$ are aligned;

$S_k^{(1)}$ represents an $(K-1)N_{rx} \times (K-1)N_{rx}$ diagonal matrix in which the singular values of $L_k$ are aligned in the diagonal elements;

$V_k^{(1)}$ represents an $N_{tx} \times (K-1)N_{rx}$ matrix in which the bases of the signal domain space of $L_k$ are aligned; and $V_k^{(0)}$ represents an $N_{tx} \times \{N_{tx}-(K-1)N_{rx}\}$ matrix in which the bases of the null space of the $L_k$ are aligned.

The transmission weight matrix of the UE #k is assumed to be a matrix obtained by aligning $v_k$ (i.e., 1 to $N_{rx}$) column vectors generated by linear combining the column vectors (i.e., the basis of the null space) of $V_k^{(0)}$. For example, the transmission weight calculator 402 performs the singular value decomposition on $H_k V_k^{(0)}$ using Expression 4.

[Expression 4]

$$H_k V_k^{(0)} = A_k [B_k O_{N_{rx} \times \{N_{tx} - KN_{rx}\}}][C_k^{(1)} C_k^{(0)}]^H \qquad (4)$$

where, $A_k$ represents an $N_{rx} \times N_{rx}$ matrix in which the left-singular vectors of $H_k V_k^{(0)}$ is aligned;

$B_k$ represents an $N_{rx} \times N_{rx}$ matrix in which the singular values of $H_k V_k^{(0)}$ are aligned in the diagonal elements;

$C_k^{(1)}$ represents an $\{N_{tx} - (K-1)N_{rx}\} \times N_{rx}$ matrix in which the bases of the signal domain space of $H_k V_k^{(0)}$ are aligned; and $c_k^{(0)}$ represents an $\{N_{tx} - (K-1)N_{rx}\} \times (N_{tx} - KN_{rx})$ matrix in which the bases of the null space of the $H_k V_k^{(0)}$ are aligned.

Here, the diagonal elements (element at the i-th row and i-th column) of $B_k$ satisfies $b_{k,1,1} \geq b_{k,2,2} \geq b_{k,N_{rx},N_{ry}}$. In other words, the diagonal elements (element at the i-th row and i-th column) of $B_k$ is assumed to be aligned from the upper left element in a descending order of the singular values.

The transmission weight calculator 402 generates a transmission weight matrix $W_k$ of the UE #k using a product of $V_k^{(0)}$ and a matrix formed of the base of the null space corresponding to $v_k$ singular values in the descending order. For example, the transmission weight matrix $W_k$ of the UE #k is represented by Expression 5.

[Expression 5]

$$W_k = V_k^{(0)} [c_{k,1}^{(1)} c_{k,2}^{(1)} \ldots c_{k,v_k}^{(1)}] \qquad (5)$$

When the channel estimated value is assumed to be free from an error, the SINR($\gamma_{k,v}$) of the layer #v of the UE #k is expressed by Expression 6 using the transmission weight matrix $W_k$. The term "SINR" is an abbreviation for a Signal-to-Interference Noise Ratio, and is an example of an index of receiving quality. An index of receiving quality can be regarded as an example of an index related to the throughput performance.

[Expression 6]

$$\gamma_{k,v} = \frac{p_{k,v} b_{k,v,v}^2}{\sigma_k^2 \|(W_k)_v\|^2} \qquad (6)$$

where, $p_{k,v}$ represents transmitting power of a desired signal of the layer #v of the UE #k; and $\sigma_k^2$ represents average noise power of the UE #k.

The above description is made in relation to an example of BD, but ZF is also be applicable. If ZF is applied, the transmission weight calculator 402 may generate a $KN_{rx} \times N_{tx}$ combined channel matrix M which combines the channels of the UE #1 to UE #k using Expression 7.

[Expression 7]

$$M = [H_1^T H_2^T \ldots H_K^T]^T \qquad (7)$$

Next, the transmission weight calculator 402 may calculate, for example, a generalized inverse matrix T of a matrix M using Expression 8.

[Expression 8]

$$T = M^H (MM^H)^{-1} \qquad (8)$$

Using the generalized inverse matrix T, the transmission weight matrix $W_k$ of the UE #k is represented by Expression 9.

[Expression 9]

$$W_k = [(T)_{(k-1)N_{rx}+1} \; (T)_{(k-1)N_{rx}+2} \; \cdots \; (T)_{kN_{rx}}] \cdot$$
$$\mathrm{diag}\left( \frac{\sqrt{p_{k,1}}}{\|(T)_{(k-1)N_{rx}+1}\|} \; \frac{\sqrt{p_{k,2}}}{\|(T)_{(k-1)N_{rx}+2}\|} \; \cdots \; \frac{\sqrt{p_{k,N_{rx}}}}{\|(T)_{k,N_{rx}}\|} \right) \qquad (9)$$

In cases where a channel estimated value is free from an error, the SINR($\gamma_{k,v}$) of the layer (stream) #v of the UE #k is represented by Expression 10 using the transmission weight matrix $W_k$.

[Expression 10]

$$\gamma_{k,v} = \frac{p_{k,v}}{\sigma_k^2 \|(W_k)_v\|^2} \qquad (10)$$

The SM calculator 403 calculates an SM in the following manner.

First of all, the SINR($\gamma_{k,v}$) is calibrated in accordance with the channel fading error $\varepsilon_k$ obtained by the channel fading error calculator 401 using Expression 11.

[Expression 11]

$$\gamma'_{k,v} = \gamma_{k,v} \cdot \left\{ 1 + \alpha \left( \varepsilon_k \frac{\tau}{T_{chest}} \right)^\beta \right\}^{-1} \qquad (11)$$

Where, the symbols $\alpha$ and $\beta$ represent positive parameters.

The SM calculator 403 may calculate an SM using the calibrated SINR($\gamma'_{k,v}$). As a non-limited example, SM(f) can be expressed by Expression 12 on the basis of the PF.

[Expression 12]

$$f = \sum_{k=1}^{K} \frac{r(\gamma'_{k,1}, \gamma'_{k,2}, \ldots, \gamma'_{k,N_{rx}})}{R_k} \qquad (12)$$

where, $R_k$ represents an average data rate of the UE #k; and $r(\gamma_1, \gamma_2, \ldots \gamma_{Nrx})$ represents a function that converts an SINR combination $(\gamma_1, \gamma_2, \ldots, \gamma_{Nrx})$ into an instant data rate.

The allocated UE combination determiner 404 may determine a candidate for a combination of UEs that maximizes the SM calculated as the above to be the combination of target UEs of transmitting a data signal (that is, to which data signals are to be transmitted).

As alternative to the calibration of the SINR($\gamma_{k,v}$), Expression 13 may be used in place of Expression 11.

[Expression 13]

$$\gamma'_{k,v} = \gamma_{k,v} \cdot \left\{ 1 + \sum_{n=1}^{N} \alpha_n \left( \varepsilon_k \frac{\tau}{T_{chest}} \right)^n \right\}^{-1} \qquad (13)$$

where, N is a natural number, and $\alpha_n$ is a positive parameter.

According to Expression 11 or Expression 13, a larger channel fading error, which means that the UE 20 is moving faster, calibrates the SINR such that the calibrated SINR is lower at a time point (an opportunity of DL transmission) when the delay time from the channel estimating timing is larger.

Accordingly, at the time point having a larger delay time τ from the channel estimating timing, a UE 20 moving fast has a lower probability of being allocated. Conversely speaking, a UE 20 moving fast has a higher probability of being allocated at the time point having a smaller delay time τ from the channel estimating timing. A UE 20 moving fast is an example of a second receiver having a faster moving speed than that of a UE 20 moving slowly, which is an example of a first receiver.

In other words, at the time point having a larger delay time τ from the channel estimating timing, a UE 20 moving slowly is more easily selected as the UE combination of target of DL transmission than a UE 20 moving fast. Conversely speaking, at the time point having a smaller delay time τ from the channel estimating timing, a UE 20 moving faster is more easily selected as the UE combination of target of DL transmission than a UE 20 moving slowly.

Accordingly, it is possible to control a DL data signal intended for a UE 20 moving fast to be allocated an opportunity of DL transmission at a timing as close to the channel estimating timing as possible. This can inhibit the throughput performance of the DL from deteriorating.

Example of Configuration of a UE

Figure 9:
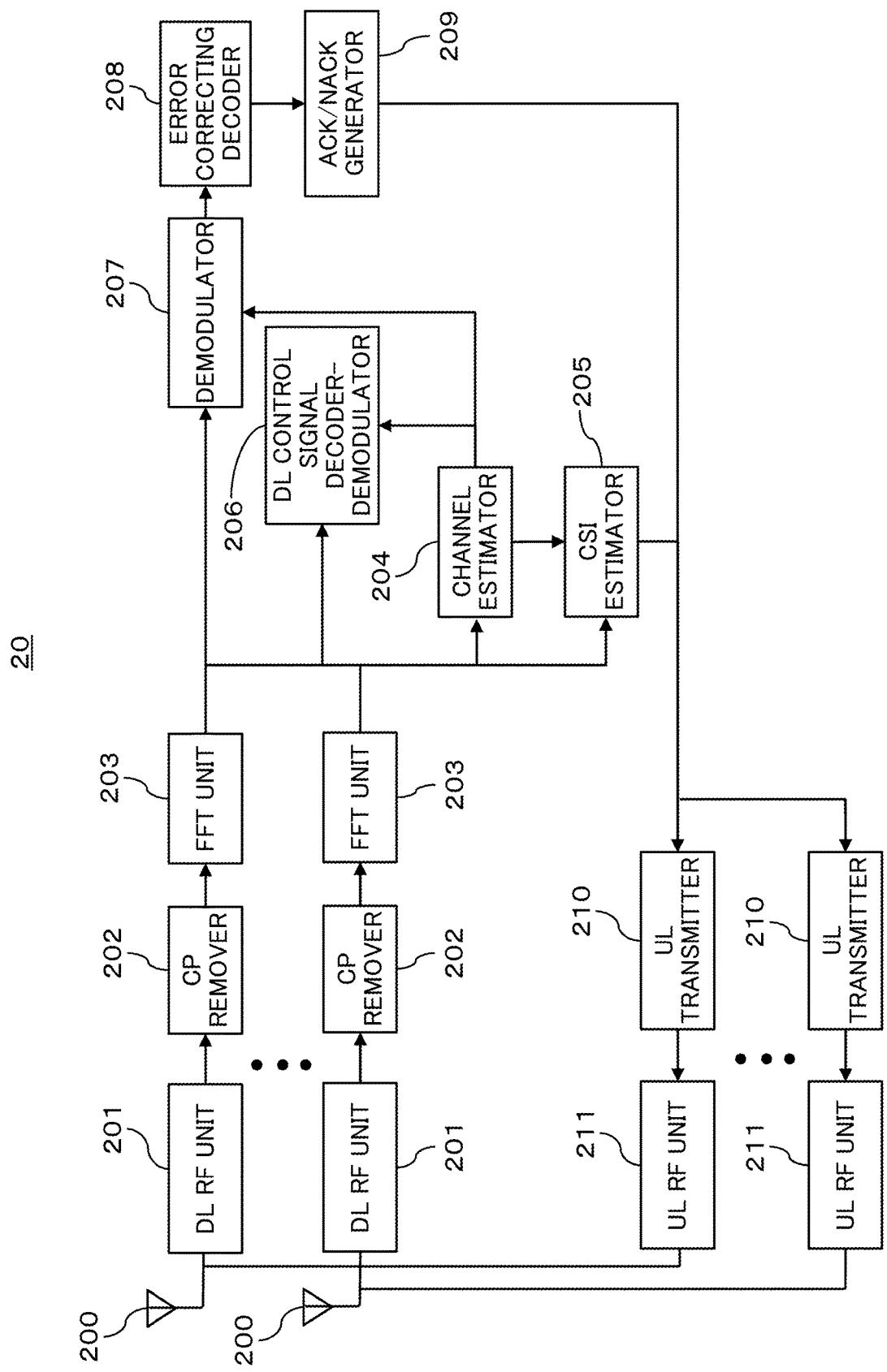
FIG. 9 is a block diagram schematically illustrating an example of the configuration of a UE according to an embodiment.

FIG. 9 illustrates an example of the configuration of a UE 20. As illustrated in FIG. 9, a UE 20 may exemplarily include antennas 200. The UE 20 may include one or more antennas 200. The antennas 200 may be shared by receiving and transmitting. Alternatively, the UE 20 may include an antenna 200 for receiving and an antenna 200 for transmitting.

The UE 20 may include a DL RF unit 201, a CP remover 202, an FFT unit 203, a channel estimator 204, a CSI estimator 205, a DL control signal decoder-demodulator 206, a demodulator 207, an error correcting decoder 208, and an ACK/NACK generator 209. These elements 201-209 can be regarded as examples of the elements constituting a DL receiving system. Furthermore, as examples of the elements constituting an UL transmitting system, the UE 20 may include an UL transmitter 210 and an UL RF unit 211.

The DL RF unit 201 exemplarily carries out a process of receiving a DL wireless signal received at the antenna 200. The process of receiving exemplarily include down-conversion and AD conversion of a wireless signal.

The CP remover 202 exemplarily removes a CP from an OFDM symbol obtained through the DL RF unit 201 and thereby obtains an effect symbol.

The FFT unit 203 exemplarily carries out Fast Fourier Transform (FFT) on the effect symbol to convert the effective symbol from a time-domain signal to a frequency-domain signal.

The DL RF units 201, the CP removers 202, and the FFT units 203 are provided as many as the number of antennas 200 in a UE 20.

The channel estimator 204 exemplarily estimates a DL channel. Channel estimating may exemplarily be accomplished by using a RS received from the base station 10.

The CSI estimator 205 estimates information (e.g., the CSI) of the DL channel quality. The estimating of a CSI may exemplarily be accomplished by using a RS (CSI-RS) for estimating the CSI received from the base station 10. The estimated CSI may be transmitted (fed back) to the base station 10.

The DL control signal decoder-demodulator 206 exemplarily demodulates and decodes a DL control signal received from the base station 10. The demodulation and decoding obtain information of whether data is allocated to the own UE 20 and MCS for a DL data signal, for example.

The demodulator 207 exemplarily demodulates a DL data signal in obedience to the MCS information obtained through the demodulation of the DL control signal.

The error correcting decoder 208 exemplarily carries out error correcting and decoding the DL data signal demodulated by the demodulator 207.

The ACK/NACK generator 209 generates ACK information when the error correcting decoder 208 succeed in error-correcting and decoding the DL data signal while generates NACK information when the error correcting decoder 208 fails.

The UL transmitter 210 exemplarily carries out a process of transmitting an UL signal to the base station 10. The process of transmitting may include error-correcting, encoding, and modulating of a data signal, the ACK/NACK information, and the CSI to be fed back to the base station 10.

The UL RF unit 211 exemplarily carries out DA conversion and up-conversion to a radio frequency on an UL signal to be transmitted to the base station 10. The DL wireless signal obtained by the UL RF unit 211 is transmitted from the antenna 200 towards the base station 10.

Second Embodiment

Figure 10:
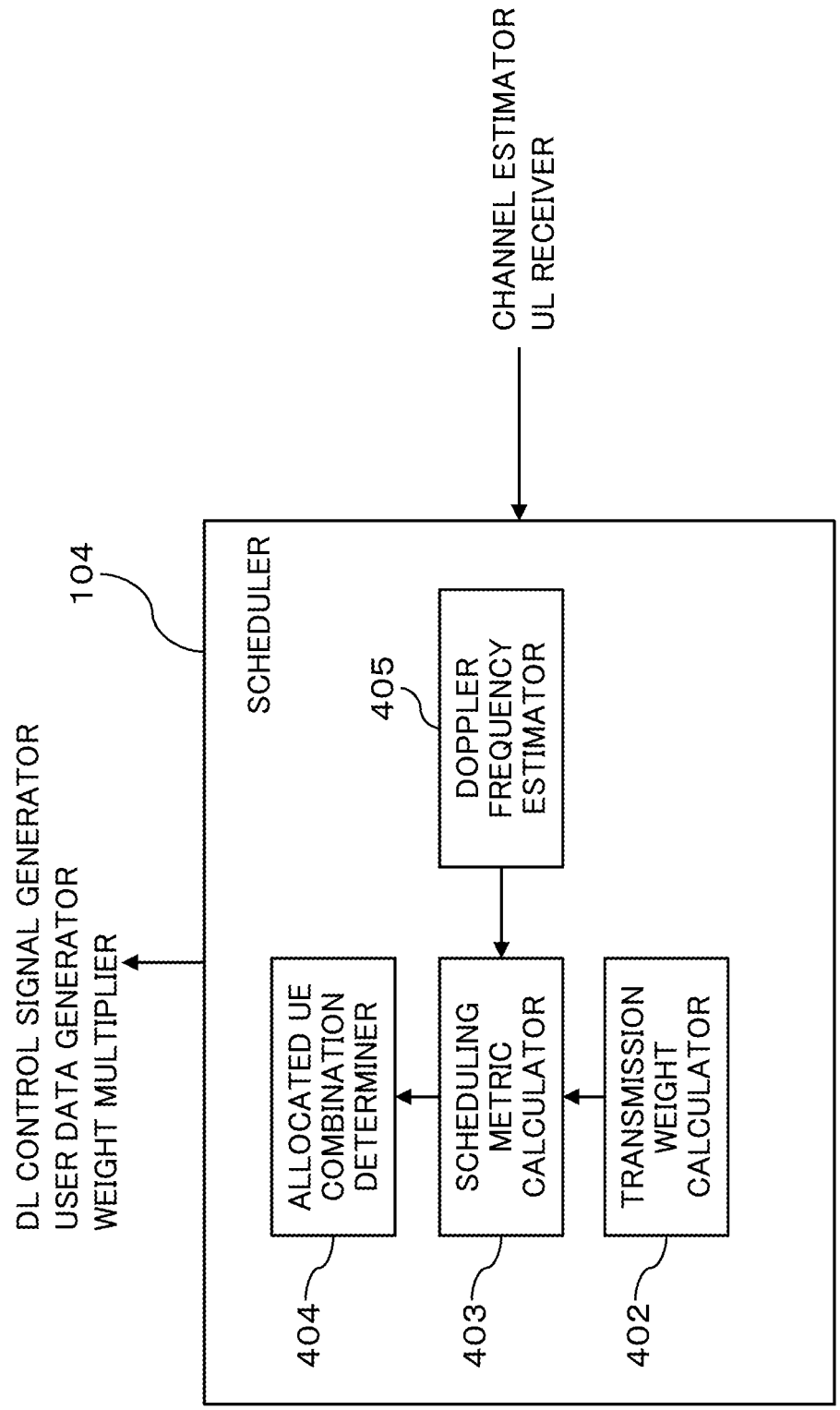
FIG. 10 is a block diagram schematically illustrating an example of the configuration of a scheduler according to a second embodiment.

Next, description will now be made in relation to a second embodiment. The second embodiment is different in detailed part of the scheduler 104 from the first embodiment. FIG. 10 illustrates an example of the configuration of the scheduler 104 according to a second embodiment.

As illustrated in FIG. 10, the scheduler 104 is exemplarily different in the point of including a Doppler frequency estimator 405 in place of the channel fading error calculator 401 illustrated in the example FIG. 7. The remaining configuration of the scheduler 104 can be the same as that of the first embodiment.

The Doppler frequency estimator 405 exemplarily estimates a maximum Doppler frequency of each UE 20 using a channel estimated value obtained by the channel estimator 102 (see FIG. 6). The maximum Doppler frequency may be obtained as an average regarding multiple channel estimating timings or as the maximum value of the average.

Figure 11:
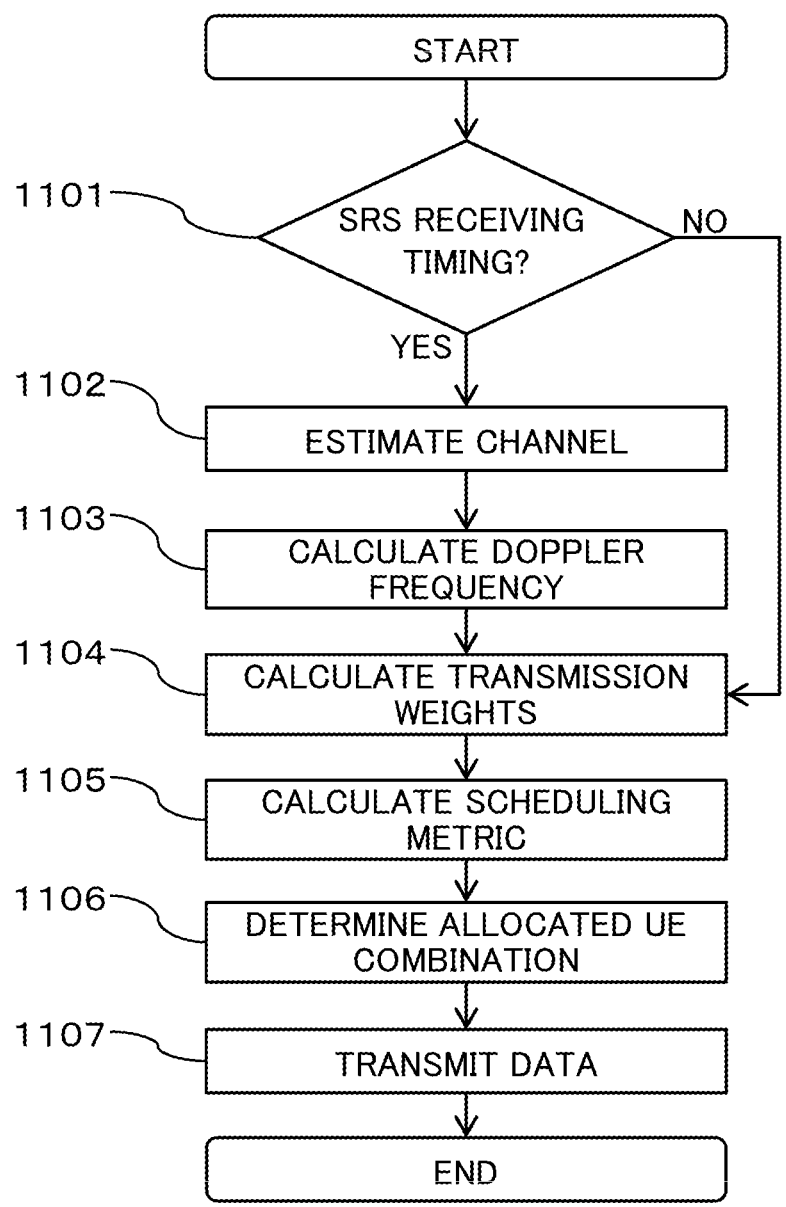
FIG. 11 is a flow diagram illustrating an example of the operation of a base station according to a second embodiment.

FIG. 11 illustrates a flow diagram of an example of the operation performed by the base station 10 including the scheduler 104 of the second embodiment.

As illustrated in the example of FIG. 11, likewise Step 801 and Step 802 of FIG. 8, the base station 10 may cause the channel estimator 102 to carry out channel estimating based on the received SRS at a timing of receiving an SRS (Yes in Step 1101 and Step 1102).

The scheduler 104 may cause the Doppler frequency estimator 405 to estimate the maximum Doppler frequency of each UE 20, using the channel estimated value obtained by the channel estimator 102 (see FIG. 6) (Step 1103).

The scheduler 104 may cause the transmission weight calculator 402 to calculate the transmission weight of each UE 20 on the basis of the channel estimated value obtained by the channel estimator 102 (Step 1104).

After the transmission weights are calculated, the scheduler 104 may cause the SM calculator 403 to calculate the SM. The SM calculator 403 may calibrate the SM using the maximum Doppler frequency obtained by the Doppler frequency estimator 405 (step 1105).

For example, the maximum Doppler frequency obtained for the k-th UE #k is represented by $f_{D,k}$. The SM calculator 403 may calibrate the SINR using the maximum Doppler frequency $f_{D,k}$ and Expression 14, for example.

[Expression 14]

$$\gamma'_{k,v} = \gamma_{k,v} \cdot \left\{ 1 + \alpha \left( f_{D,k} \frac{\tau}{T_{chest}} \right)^{\beta} \right\}^{-1} \quad (14)$$

where, α and β are positive parameters.

Alternatively, the SM calculator 403 may calibrate the SINR using Expression 15 in place of Expression 14.

[Expression 15]

$$\gamma'_{k,v} = \gamma_{k,v} \cdot \left\{ 1 + \sum_{n=1}^{N} \alpha_n \left( f_{D,k} \frac{\tau}{T_{chest}} \right)^{n} \right\}^{-1} \quad (15)$$

where N is a natural number and $\alpha_n$ is a positive parameter.

Expressions 14 and 15 each mean that the index of desired receiving quality in a UE 20, which index is used for calculating the SM at the opportunity (timing) of transmitting a DL signal, is calibrated to be lower when the UE 20 having a larger Doppler frequency obtained on the basis of the channel estimated value.

The scheduler 104 may cause the allocated UE combination determiner 404 to determine a combination of UEs 20 that maximizes the SM to be the combination of target UEs of transmitting a data signal (Step 1106).

The scheduler 104 may provide the user data generators 105 with an instruction to transmit a data signal to the determined combination of UEs and may provide the weight multiplier 106 with the transmission weights to be applied to the determined combination of UEs. Thereby, a data signal is to be transmitted to the determined combination of the UEs (Step 1107).

If the present time point is not at the timing of receiving an SRS (NO in Step 1101), the scheduler 104 may skip Step 1102 (estimating a channel) and Step 1103 (calculating a channel fading error), and carry out process of and subsequent to Step 1104 (calculating transmission weights).

Since a maximum Doppler frequency is estimated from more samples than samples that used in estimating a channel fading error, a maximum Doppler frequency takes a longer time to be estimated than a channel fading error, but can be considered to be more precise than a channel fading effect.

Accordingly, calibration of the SINR using a maximum Doppler frequency like the second embodiment may sometimes expect further improvement of the DL throughput performance as compared with the first embodiment.

The scheduler 104 is allowed to include both the channel fading error calculator 401 of the first embodiment and the Doppler frequency estimator 405 of the first embodiment. In this case, a channel fading error and a (maximum) Doppler frequency may be selectively input into the SM calculator 403 to be used for calculating the SM.

For example, in cases where the maximum Doppler frequency is calculated using more samples of channel estimated values than those used for calculating a channel fading error in order to obtain the average, the maximum Doppler frequency is obtained at a timing later than a timing at which the channel fading error is obtained.

For the above, calibration of the SM may use the channel fading error until the maximum Doppler frequency is obtained, and then use the maximum Doppler frequency in place of the channel fading error once the maximum Doppler frequency has been obtained.

Third Embodiment

The above first and second embodiments carry out scheduling of the time point t and transmitting of a data signal, and then carry out a scheduling process of at the time point t+1. Specifically, the foregoing embodiments chronologically carry out scheduling and data transmitting in succession.

Since such chronological and successive process sequentially allocates UEs 20 to opportunities of DL transmission having smaller delay time τ from the channel estimating timing, there is a possibility that a UE 20 moving fast is compelled to be allocated to an opportunity of DL transmission having a larger delay time τ.

With foregoing the above inconvenience, the third embodiment may collectively determine (schedule), at the time point (e.g., the time point t) when a channel is estimated, the allocated UE combinations for respective time points (t, t+1, . . . , $T_{chest}$−1) from the time point t to a time point of the future channel estimating (time point t+$T_{chest}$).

The scheduling may be carried out in the chronological order of time points t, t+1, . . . , $T_{chest}$−1. However, scheduling in the reverse order of time points t+$T_{chest}$−1, t+$T_{chest}$−2, . . . , t to the chronological order can reduce the probability of occurring the above cases which are caused in the chronological process.

The base station 10 may transmit a data signal at each time point in accordance with the result of scheduling collectively determined.

Figure 12:
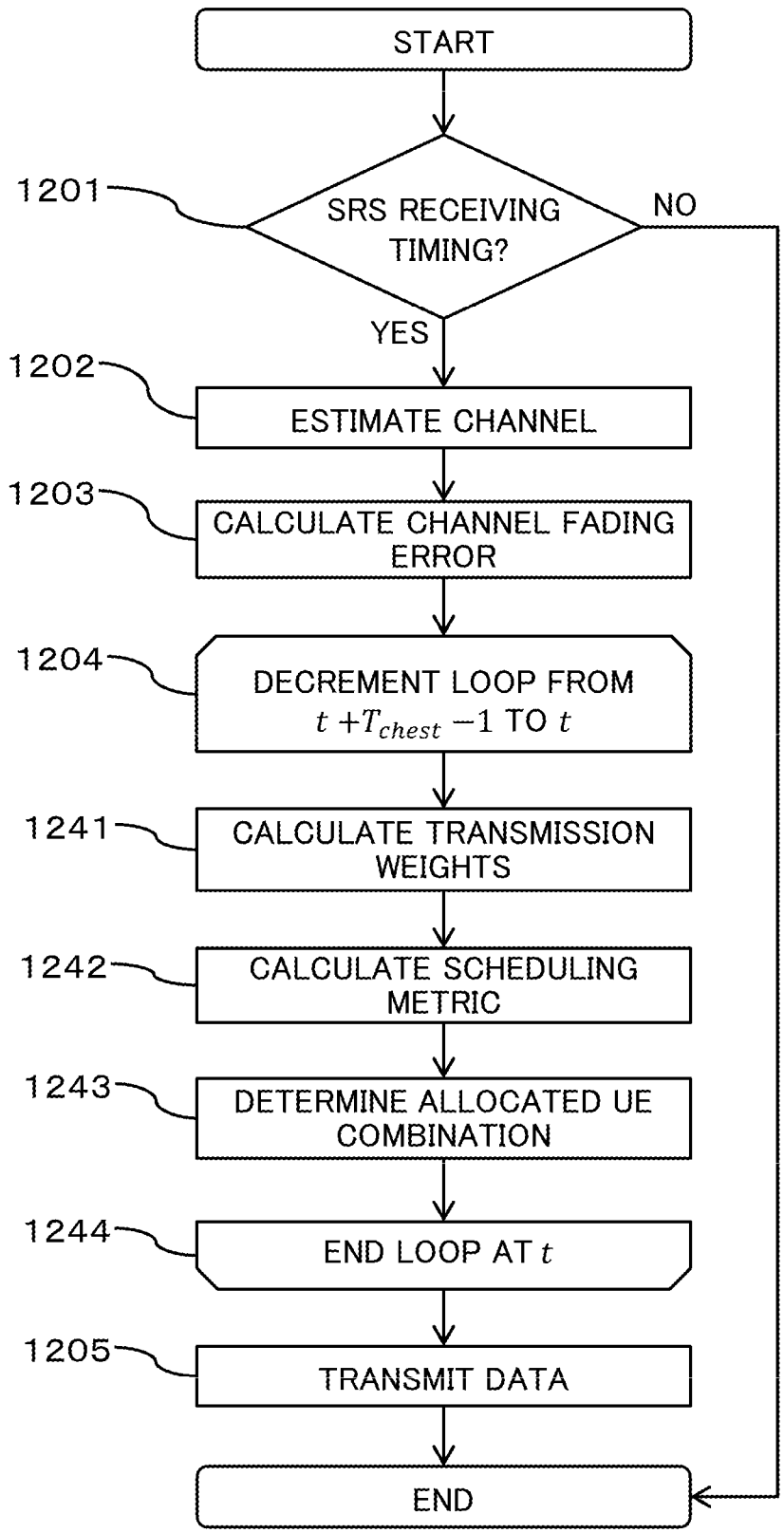
FIG. 12 is a flow diagram illustrating an example of the operation of a base station according to a third embodiment.

FIG. 12 is a flow diagram illustrating an example of operation of the base station 10 including the scheduler 104 according to the third embodiment. In the example of FIG. 12, scheduling is carried out in the reverse order (time points t+$T_{chest}$−1, t+$T_{chest}$−2, . . . , t) to the chronological order.

As illustrated in FIG. 12, likewise the first and the second embodiments, the base station 10 may cause the channel estimator 102 to carry out channel estimating based on the received SRS at a timing of receiving an SRS (Yes in Step 1201 and Step 1202).

In response to the execution of the channel estimating, the base station 10 (e.g., the scheduler 104) may cause the channel fading error calculator 401 to calculate a channel fading error on the basis of the channel estimated value obtained by the channel estimator 102 (Step 1203) likewise the first embodiment.

Then, the scheduler 104 may repeat Steps 1241 to 1243 in decrement in the order of time points t+$T_{chest}$−1, t+$T_{chest}$−2, . . . , t in a loop process of step 1204.

In Step 1241, the scheduler 104 causes the transmission weight calculator 402 to calculate the transmission weight for each UE 20 on the basis of the channel estimate value obtained by the channel estimator 102 (Step 1241).

In Step 1242, the scheduler 104 causes the SM calculator 403 to calculate the SM. Additionally, the SM calculator 403 may calibrate the SM in accordance with the channel fading error obtained by the channel fading error calculator 401 (Step 1242) likewise the first embodiment.

In Step 1243, the scheduler 104 may cause the allocated UE combination determiner 404 to determine, for example, a combination of UEs 20 that maximizes the SM to be the combination of target UEs to which a data signal is to be transmitted (Step 1243).

Upon determining the combination of UEs for the time point t, the loop process of Step 1204 terminates (loop end, Step 1244).

In response to the loop end, the base station 10 may transmit a data signal to the combinations of UEs determined for the respective time points at the time points t+T$_{chest}$−1, t+T$_{chest}$−2, . . . , t (Step 1205).

For example, the scheduler 104 may provide the user data generators 105 with an instruction to transmit a data signal to the determined combination of the UEs determined for each of the time points and may provide the weight multiplier 106 with transmission weights to be applied to the determined combination of UEs for each time point.

If the present time point is not at the timing of receiving an SRS (NO in Step 1201), the scheduler 104 may terminate the process. Otherwise, the scheduler 104 may be carried out calculating of transmission weights, calculating of the SM, determining of an allocated UE combination, and transmitting of a data signal likewise the first embodiment (e.g., Steps 804-807 of FIG. 8).

The third embodiment may be carried out in combination with the second embodiment. For example, calculating of a channel fading error in Step 1203 of FIG. 12 may be replaced by or be carried out along with estimating of a Doppler frequency (see FIG. 11) by the scheduler 104.

In this case, in calculating of the SM (Step 1242) in the loop process of Step 1204, the SM may be calibrated in accordance with the estimated Doppler frequency likewise the second embodiment.

Fourth Embodiment

In a fourth embodiment, the scheduler 104 may calibrate the SINR, which is an example of the SM, using an SINR calibration value $\delta_{k,\tau}$[dB] for each UE 20 at each of the delay times $\tau$(0, 1, . . . , T$_{chest}$−1) from the channel estimating timing.

For example, the SINR($\gamma_k$) at the time point t having a delay time $\tau$ from the latest channel estimating timing may be calibrated by Expression 16.

[Expression 16]

$$\gamma'_{k,v} = \gamma_{k,v} \cdot 10^{\frac{\delta_{k,\tau}(t)}{10}} \quad (16)$$

Here, an SINR calibration value $\delta_{k,\tau}$ is controlled by ACK/NACK information fed back from each UE 20 in relation to data transmitted to the UE 20 at the time point corresponding to the delay time $\tau$ from the channel estimating timing.

Figure 13:
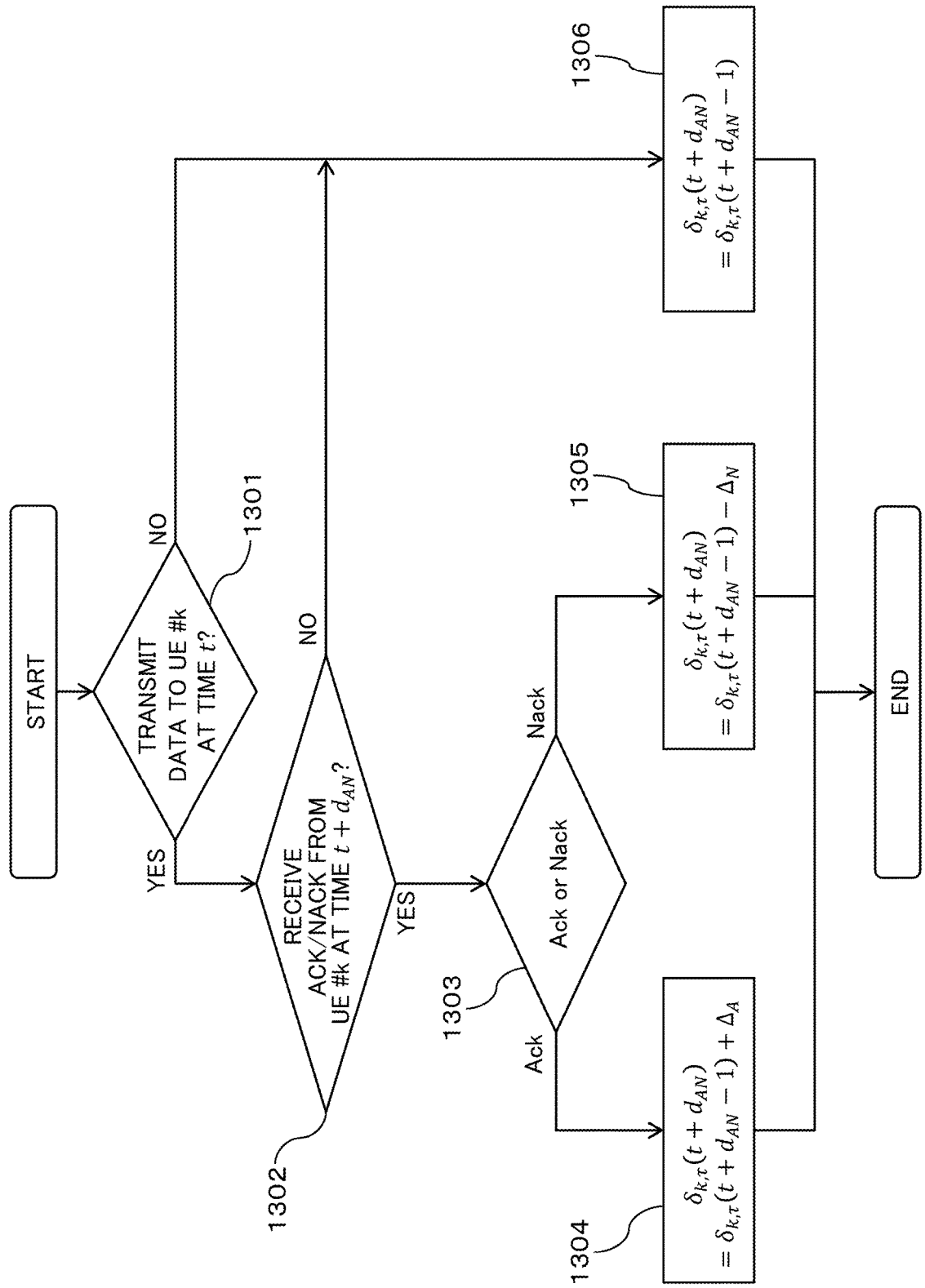
FIG. 13 is a flow diagram illustrating an example of the operation of a base station according to a fourth embodiment.

FIG. 13 is a flow diagram illustrating an example of the operation of the base station 10 including the scheduler 104 according to the fourth embodiment.

As illustrated in the example FIG. 13, the base station 10 may confirm whether a data signal is transmitted to the UE #k at the time point t in obedience to, for example, an instruction from the scheduler 104 (Step 1301).

If a data signal is transmitted (YES in Step 1301), the base station 10 may cause to scheduler 104 to confirm whether ACK/NACK information from the UE #k is received at the time point t+d$_{AN}$ (Step 1302).

If the ACK/NACK information is received (YES in Step 1302), the base station 10 causes the scheduler 104 to confirm whether the received information is ACK information or NACK information (Step 1303).

The description here assumes that receiving of ACK information is confirmed in Step 1303, which means that in response to the data transmitted to the UE #k at the time point corresponding to a delay time $\tau$ from the channel estimating timing, ACK information is fed back from the UE #k to the base station 10 at the time point t+d$_{AN}$ containing feed-back delay d$_{AN}$ of ACK/NACK information.

In this case, the scheduler 104 may update the current SINR calibration value $\delta_{k,\tau}$ (of the current time point t+d$_{AN}$) by adding a positive offset value $\Delta_A$ to the previous SINR calibration value $\delta_{k,\tau}$ (of the time point t+d$_{AN}$−1) as exemplified by Expression 17 (Step 1304). The time point t+d$_{AN}$−1 is an example of a first opportunity of transmitting and the time point t+d$_{AN}$ is an example of a second opportunity of transmitting.

[Expression 17]

$$\delta_{k,\tau}(t+d_{AN}) = \delta_{k,\tau}(t+d_{AN}-1) + \Delta_A \quad (17)$$

Addition of the positive offset value $\Delta_A$ makes current SINR calibration value $\delta_{k,\tau}$ larger than the previous value, and therefore the SINR is calibrated so as to be higher than the previous SINR (of the time point t+d$_{AN}$−1).

Accordingly, a UE #k having a higher probability of receiving ACK information in the base station 10 is more easily selected as the combination of UEs for the next opportunity of DL transmission.

In contrast to the above, if NACK information is fed back, the scheduler 104 may update the current SINR calibration value $\delta_{k,\tau}$ by subtracting a positive offset value $\Delta_N$ from the previous SINR calibration value $\delta_{k,\tau}$ using Expression 18 (Step 1305). If a receiving error rate is normally controlled in the UE #k, the UE #k is consider to have a higher probability of feeding back ACK information than NACK information and therefore the offset value $\Delta_N$ may be set so as to satisfy $\Delta_A < \Delta_N$.

[Expression 18]

$$\delta_{k,\tau}(t+d_{AN}) = \delta_{k,\tau}(t+d_{AN}-1) - \Delta_N \quad (18)$$

Since the subtraction of a positive offset value $\Delta_N$ makes the current SINR calibration value $\delta_{k,\tau}$ smaller than the previous one, the SINR is calibrated so as to be lower than the previous SINR (of the time point t+d$_{AN}$−1).

Accordingly, a UE #k having a higher probability of receiving NACK information in the base station 10 is less easily selected as the combination of UEs for the next opportunity of DL transmission.

As the above, since a UE #k having a high probability of receiving ACK information is more easily selected as the combination of UEs in the next opportunity of transmitting than a UE #k having a high probability of receiving NACK information, so that the DL throughput performance can be expected.

If a data signal is not transmitted (NO in Step 1301), the scheduler 104 may use the following Expression 19 (Step 1306). Also if the ACK/NACK information is not received (NO in Step 1302), the scheduler 104 may use the following Expression 19 (Step 1306).

[Expression 19]

$$\delta_{k,\tau}(t+d_{AN}) = \delta_{k,\tau}(t+d_{AN}-1) \quad (19)$$

Expression 19 means that the current SINR calibration value $\delta_{k,\tau}$ kept to be the previous SINR calibration value $\delta_{k,\tau}$. Accordingly, also the SINR is kept to be the previous value (of the time point $t+d_{AN}-1$).

However, if feedback of ACK/NACK information in response to the transmitted data signal is not received (NO in Step 1302), the scheduler 104 determines that the UE #k has failed in receiving the data signal and may apply Expression 18 to Step 1306.

This means that the scheduler 104 may treat a UE #k not respond to the DL data transmission the same as the UE #k from which the NACK information is received, and update the SINR calibration value $\delta_{k,\tau}$ thereof to come to be smaller.

This makes a UE #k not respond to the DL data transmission be less easily selected as the combination of UEs for the next opportunity of DL transmission likewise a UE #k having failed in receiving a DL data signal.

(Example of Hardware Configuration)

Figure 14:
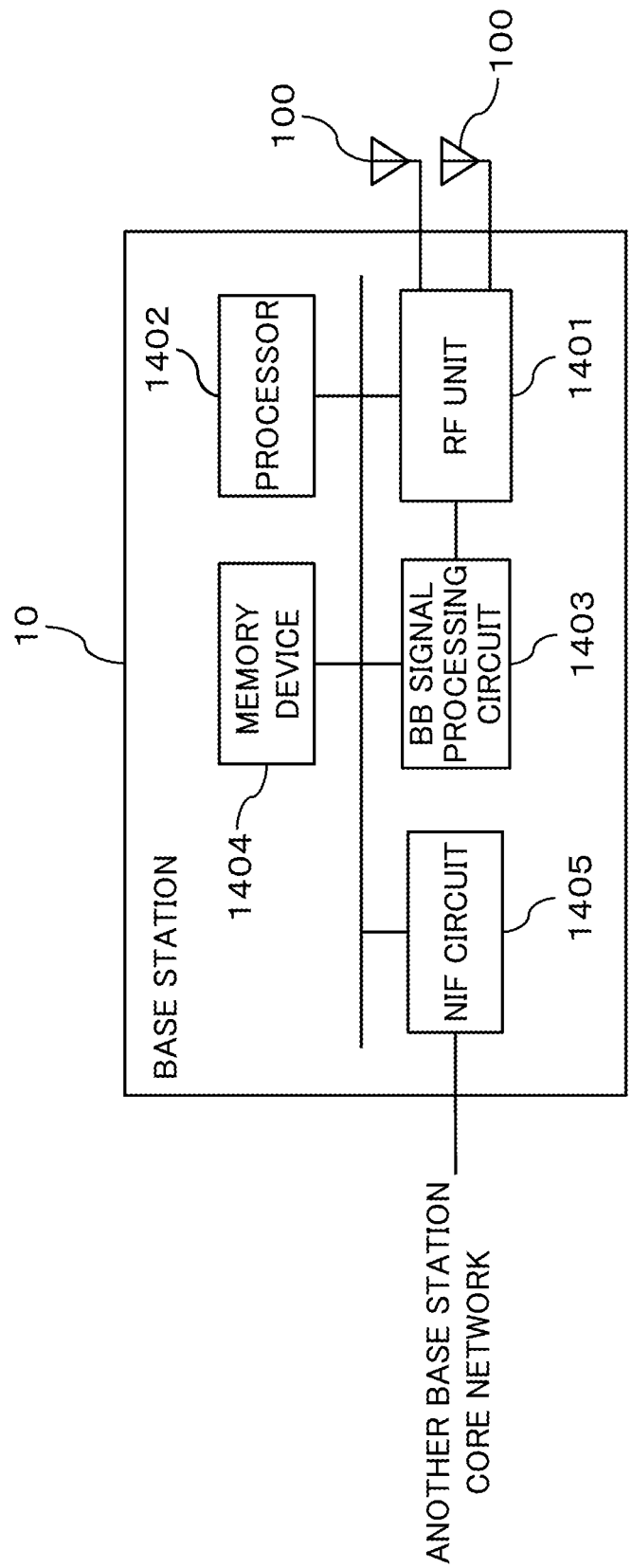
FIG. 14 is a block diagram schematically illustrating an example of a hardware configuration of a base station according to an embodiment.
Figure 15:
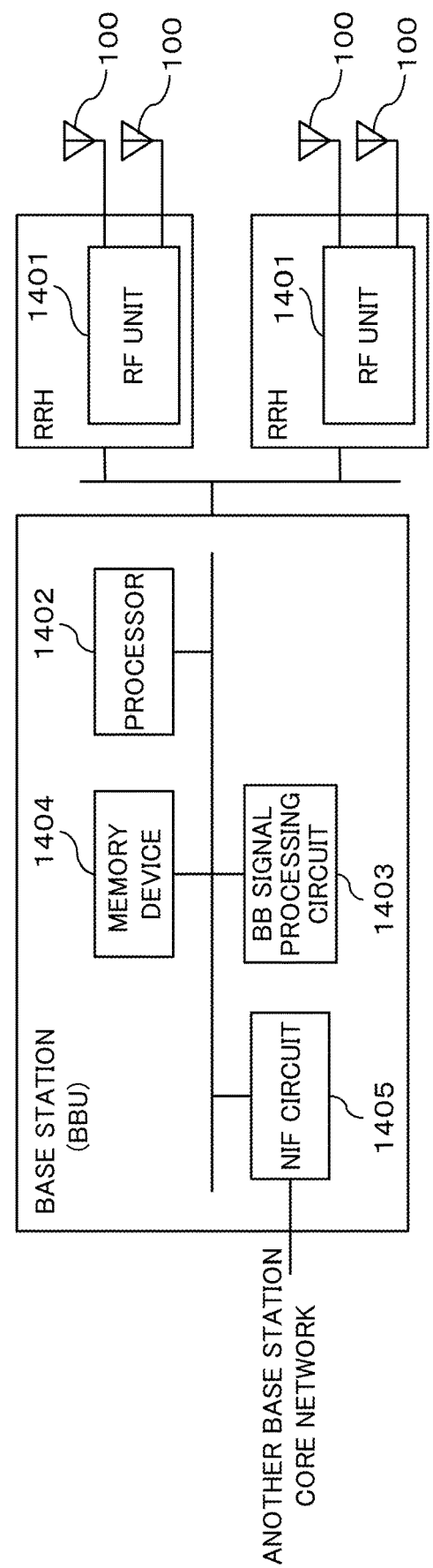
FIG. 15 is a block diagram schematically illustrating another example of a hardware configuration of a base station according to an embodiment.

Next, FIGS. 14 and 15 illustrate examples of the hardware configuration of the base station 10 of the first to the fourth embodiments, and FIG. 16 illustrates an example of the hardware configuration of the UE 20 of the first to the fourth embodiment.

(Example of Base Station)

The base station 10 may have the configuration illustrated in the example FIG. 14 or that illustrated in the example FIG. 15. The example of the configuration of FIG. 14 includes a RF unit 1401 in the main unit of the base station. The example of the configuration of FIG. 15 includes one or more RF units 1401 isolated from the main unit of the base station and accommodated in one or more remote RRHs.

In contrast to the RRH, the main unit of the base station is sometimes referred to as a Baseband Unit (BBU) or a Centralized Baseband Unit (C-BBU). As an example, an optical interface conforming to CPRI may be used for the connection between the RRH and BBU. The term "CPRI" is an abbreviation for Common Public Radio Interface.

As illustrated in FIG. 14, the base station 10 may include the antennas 100, a RF unit 1401, a processor 1402, a BaseBand (BB) signal processing circuit 1403, a memory device 1404, and a Network InterFace (NIF) circuit 1405.

The RF unit 1401 exemplarily carries out a process of wireless DL transmission and a process of wireless UL receiving. The process of wireless DL transmission may include, for example, up-conversion of a DL transmission signal to a wireless frequency and DA conversion of the DL transmission signal. The process of UL wireless receiving may include, for example, down-conversion of an UL receiving signal to the baseband frequency and AD conversion of the UL receiving signal.

The processor 1402 achieves the operation and the function of the base station 10 of the above first to fourth embodiments by exemplarily reading and executing a program and data stored in the memory device 1404. A "program" can also referred to as "software" and an "application".

The scheduler 104 described above can be considered to be achieved by, for example, a processor 1402 functioning in obedience to a program that achieves the scheduling. A non-limited example of the processor 1402 is a Central Processing unit (CPU). The CPU here may be a single-core CPU or a multiple-core CPU.

The BB signal processing circuit 1403 exemplarily carries out a BB signal process on a DL transmission signal and an UL receiving signal. Examples of the BB signal process may include encoding and modulating of a DL transmission signal, and demodulating and decoding of an UL receiving signal.

Part or entire of the BB signal processing circuit 1403 may be exemplarily achieved by a Digital Signal Processor (DSP). Alternatively, part or entire of the BB signal processing circuit 1403 may be exemplarily achieved by a Large Scale Integration (LSI) or a Programmable Logic Device (PLD).

The processor 1402 and the BB signal processing circuit 1403 are allowed to be integrated into a single "processing apparatus".

The memory device 1404 exemplarily stores the above programs, data, and information described above. An example of the memory device 1404 may include one or more of a RAM, a ROM, a HDD, an SSD, a semiconductor memory, and an organic memory.

The term "RAM" is an abbreviation for a "Random Access Memory"; the term "ROM" is an abbreviation for a "Read Only Memory"; the term "HDD" is an abbreviation for a "Hard Disk Drive"; and the term "SSD" is an abbreviation for a "Solid State Drive".

Alternatively, the memory device 1404 may include a reader device that can read information from a recording medium such as a flexible disk, an optical disk, a magneto-optical disk, and a semiconductor memory.

The NIF circuit 1405 exemplarily provides connection to one or both of another base station 10 and the core network. A connection interface between base stations 10 may be referred to as an "X2 interface". An "X2 interface" is an example of a wired interface. Alternatively, a wireless interface may be applied to a connection interface between base stations 10.

A connection interface between the base station 10 and the core network may be referred to as an "S1 interface". An "S1 interface" is an example of a wired interface. Alternatively, a wireless interface may be applied to a connection interface between the base stations 10 and a core network.

A core network may be regarded as an example of an "higher-level network" of the base station 10. A core network may include a Mobility Management Entity (MME), a Packet Data Network Gateway (PGW), and a Serving Gateway (SGW).

A network accommodating the base station 10 and the core network may also be referred to as a radio access network (RAN). An example of a RAN includes an evolved universal terrestrial RAN (E-UTRAN).

In the example of the configuration of FIG. 15, blocks represented by the same reference numbers as these of FIG. 14 represent the same or substantially same parts or functions described the above with reference to FIG. 14. In the example of the configuration of FIG. 15, the multiple RRHs may form respective cells or the antennas 100 of the multiple RRHs may form a distributed antenna system to achieve the MU-MIMO.

(Example of Configuration of UE)

As illustrated in FIG. 16, a UE 20 may include antennas 200, a RF unit 1601, a processor 1602, a BaseBand (BB) signal processing circuit 1603, and a memory device 1604.

The RF unit 1601 exemplarily carries out a process of wireless UL transmission and a process of wireless DL receiving. The process of wireless UL transmission process may include, for example, up-conversion of an UL transmission signal to a radio frequency and DA conversion of the UL transmission signal. The process of wireless DL receiving may include, for example, down-conversion of a DL receiving signal to the baseband frequency and AD conversion of a DL receiving signal.

The processor 1602 achieves the operations and functions of the UE 20 by reading and then executing programs, data, and information recorded in the memory device 1604. A non-limited example of the processor 1602 is a CPU, which may be a single-core CPU or a multi-core CPU.

The BB signal processing circuit 1603 exemplarily carries out a BB signal process on a UL transmission signal and a DL receiving signal. Examples of the BB signal process may include encoding and modulating of an UL transmission signal and demodulating and decoding of a DL receiving signal.

Part or the entire of the BB signal processing circuit 1603 may exemplarily be achieved by a DSP. Alternatively, part or the entire of the BB signal processing circuit 1603 may exemplarily be achieved by an LSI or a PLD.

The processor 1602 and the BB signal processing circuit 1603 are allowed to be integrated into a single "processor apparatus".

The memory device 1604 exemplarily stores programs, data, and information that achieve the operations of the UE 20. An example of the memory device 1604 may include one or more of a RAM, a ROM, a semiconductor memory, and an organic memory.

As an aspect of the embodiments, signal interference between receivers can be suppressed, so that the throughput performance can be enhanced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmitter comprising:
   a plurality of transmission antennas;
   a channel estimator configured to estimate channels between the plurality of transmission antennas and a plurality of receivers;
   a scheduler configured to schedule a combination of target receivers of transmitting downlink signals on same radio resource among the plurality of receivers; and
   a transmitter configured to transmit downlink signals intended for the combination scheduled by the scheduler by beam forming from the plurality of transmission antennas on the same radio resource, wherein
   the scheduler modifies a selecting rule related to the combination of target receivers in accordance with a time between a timing of estimating the channels and a timing of transmitting the downlink signal.

2. The transmitter according to claim 1, wherein the modifying of the selecting rule comprising calibrating the selecting rule such that the probability that a second receiver is selected as the combination becomes lower as the timing of transmitting the downlink signal has a larger time, the second receiver being a receiver for which information indicating that the second receiver has a moving speed faster than that of a first receiver is obtained.

3. The transmitter according to claim 2, wherein the calibrating of the selecting rule comprises calibrating, using the information, an index of receiving quality expected for the second receiver when the downlink signal is transmitted by the beam forming, the index being used for calculating the selecting rule.

4. The transmitter according to claim 3, wherein:
   the information is a fading error between the channels estimated at a plurality of timings; and
   the calibration of the index of receiving quality comprises calibrating the index of receiving quality to be lower as the fading error between the channels is larger.

5. The transmitter according to claim 3, wherein:
   the information is a Doppler frequency obtained based on a result of the estimating of the channels; and
   the calibration of the index of receiving quality comprises calibrating the index of receiving quality to be lower as the Doppler frequency is higher.

6. The transmitter according to claim 1, wherein the scheduling determines, for a plurality of the timings of transmitting the downlink signal at a plurality of the timings of estimating the channels, the combination in a reverse order to a chronological order.

7. The transmitter according to claim 1, wherein the modifying of the selecting rule comprises calibrating, by receiving acknowledgement information responsive to the downlink signal transmitted to each of the plurality of receivers at a first timing of transmitting in the time, an index of receiving quality expected for the receiver when the downlink signal is transmitted by the beam forming at a second timing of transmitting, the index being used for calculating the selecting rule.

8. The transmitter according to claim 7, wherein the calibrating of the index of receiving quality comprises increasing the index of receiving quality when the receiving acknowledgement information represents success in receiving or decoding of the downlink signal.

9. The transmitter according to claim 7, wherein the calibrating of the index of receiving quality comprises decreasing the index of receiving quality when the receiving acknowledgement information represents failure in receiving or decoding of the downlink signal.

10. The transmitter according to claim 7, wherein the calibrating of the index of receiving quality comprises maintaining or decreasing the index of receiving quality when receiving of the receiving acknowledgement information is not confirmed.

11. A wireless communication system comprising:
    a transmitter; and
    a plurality of receivers, wherein
    the transmitter comprises
    a plurality of transmission antennas;
    a channel estimator configured to estimate channels between the plurality of transmission antennas and the plurality of receivers;
    a scheduler configured to schedule a combination of target receivers of transmitting downlink signals on same radio resource among the plurality of receivers; and
    a transmitter configured to transmit downlink signals intended for the combination scheduled by the scheduler by beam forming from the plurality of transmission antennas on the same radio resource, wherein
    the scheduler modifies a selecting rule related to the combination of target receivers in accordance with a time between a timing of estimating the channels and a timing of transmitting the downlink signal.

12. A method for processing in a transmitter that wirelessly communicates with a plurality of receiver using a plurality of transmission antennas, the method comprising:

estimating channels between the plurality of transmission antennas and the plurality of receivers;

scheduling a combination of target receivers of transmitting downlink signals on same radio resource among the plurality of receivers; and transmitting downlink signals intended for the combination scheduled by the scheduler by beam forming when the plurality of transmission antennas on the same radio resource, wherein the scheduling comprising modifying a selecting rule related to the combination of target receivers in accordance with a time between a timing of estimating the channels and a timing of transmitting the downlink signal.

* * * * *